US008867326B2

(12) United States Patent
Ueki

(10) Patent No.: US 8,867,326 B2
(45) Date of Patent: Oct. 21, 2014

(54) APPARATUS FOR REPRODUCING A SIGNAL FROM A DISC-SHAPED INFORMATION RECORDING MEDIUM HAVING A PLURALITY OF RECORDING LAYERS WITH DIFFERENT AREAS

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 20 days.

(21) Appl. No.: 13/294,611

(22) Filed: Nov. 11, 2011

(65) Prior Publication Data

US 2012/0057442 A1 Mar. 8, 2012

Related U.S. Application Data

(62) Division of application No. 12/654,704, filed on Dec. 29, 2009, now Pat. No. 8,446,805, which is a division of application No. 11/080,805, filed on Mar. 16, 2005, now Pat. No. 7,680,020.

(30) Foreign Application Priority Data

Apr. 9, 2004 (JP) ................................. 2004-115190
Jan. 24, 2005 (JP) ................................. 2005-015027

(51) Int. Cl.
G11B 7/00 (2006.01)
G11B 7/007 (2006.01)
G11B 7/1267 (2012.01)

(52) U.S. Cl.
CPC ...... *G11B 7/1267* (2013.01); *G11B 2007/0013* (2013.01); *G11B 7/00736* (2013.01)
USPC ........................................................ 369/47.1

(58) Field of Classification Search
None
See application file for complete search history.

(56) References Cited

U.S. PATENT DOCUMENTS

| 6,404,713 | B1 * | 6/2002 | Ueki .......................... 369/47.53 |
| 6,580,683 | B1 | 6/2003 | Braitberg et al. |
| 7,023,777 | B2 | 4/2006 | Miyazaki et al. |
| 7,061,850 | B1 * | 6/2006 | Irie et al. .................... 369/59.24 |
| 7,376,058 | B2 | 5/2008 | Narumi et al. |
| RE41,082 | E | 1/2010 | Kanai et al. |
| 2002/0118617 | A1 * | 8/2002 | Hyun .......................... 369/47.33 |
| 2002/0136122 | A1 | 9/2002 | Nakano |
| 2003/0137909 | A1 * | 7/2003 | Ito et al. .................... 369/47.14 |

(Continued)

FOREIGN PATENT DOCUMENTS

JP 10-142873 5/1998
JP 2003-022532 1/2003

(Continued)

*Primary Examiner* — Wayne Young
*Assistant Examiner* — Mark Fischer
(74) *Attorney, Agent, or Firm* — Louis Woo

(57) ABSTRACT

A disc-shaped information recording medium includes a laminate of recording layers on and from which an information signal can be optically recorded and reproduced from one side of the medium. Data areas are provided in the recording layers, respectively. The information signal can be recorded on and reproduced from the data areas while a laser beam emitted from an optical pickup is applied to the data areas. Optical recording test areas are provided in the recording layers, respectively. A test signal can be recorded on and reproduced from the optical recording test areas to decide optimum power values of the laser beam for signal recording. The test areas are out of overlap as viewed in a direction of propagation of the laser beam.

3 Claims, 13 Drawing Sheets

(56) References Cited

U.S. PATENT DOCUMENTS

| | | |
|---|---|---|
| 2003/0179670 A1 | 9/2003 | Fukushima et al. |
| 2003/0185118 A1* | 10/2003 | Takeda ................. 369/47.39 |
| 2003/0185121 A1 | 10/2003 | Narumi et al. |
| 2004/0076096 A1* | 4/2004 | Hwang et al. ........... 369/53.21 |
| 2004/0085874 A1 | 5/2004 | Akiyama et al. |
| 2004/0136303 A1 | 7/2004 | Watanabe et al. |
| 2004/0174793 A1 | 9/2004 | Park et al. |
| 2004/0179445 A1 | 9/2004 | Park et al. |
| 2004/0185216 A1* | 9/2004 | Hwang et al. ............. 428/64.4 |
| 2004/0208098 A1* | 10/2004 | Hwang et al. ........... 369/53.17 |
| 2004/0223446 A1* | 11/2004 | Lee ........................ 369/275.3 |
| 2004/0233803 A1 | 11/2004 | Kawamae et al. |
| 2005/0025012 A1 | 2/2005 | Watabe |
| 2005/0169132 A1 | 8/2005 | Kuraoka et al. |
| 2006/0153035 A1 | 7/2006 | Eguchi et al. |
| 2007/0297304 A1 | 12/2007 | Mawatari et al. |

FOREIGN PATENT DOCUMENTS

| | | |
|---|---|---|
| JP | 2004-206849 | 7/2004 |
| JP | 2004-295940 | 10/2004 |
| JP | 2005-038584 | 2/2005 |
| JP | 2005-063628 | 3/2005 |
| WO | 02/23542 | 3/2002 |
| WO | 2004/081936 | 3/2004 |

* cited by examiner

APPARATUS FOR REPRODUCING A SIGNAL FROM A DISC-SHAPED INFORMATION RECORDING MEDIUM HAVING A PLURALITY OF RECORDING LAYERS WITH DIFFERENT AREAS

CROSS REFERENCES TO RELATED APPLICATIONS

This application is a division of U.S. application Ser. No. 12/654,704, filed on Dec. 29, 2009, now U.S. Pat. No. 8,446,805 which in turn is a division of U.S. application Ser. No. 11/080,805, filed on Mar. 16, 2005, now U.S. Pat. No. 7,680,020.

BACKGROUND OF THE INVENTION

1. Field of the Invention

This invention relates to an information recording medium having a plurality of recording layers which can be accessed from one side of the medium. An example of such an information recording medium is a two-layer single-sided DVD (digital versatile disc). In addition, this invention relates to a method and an apparatus for recording a signal on an information recording medium. Furthermore, this invention relates to a method and an apparatus for recording and reproducing a signal on and from an information recording medium.

2. Description of the Related Art

A two-layer single-sided DVD has a disc substrate whose one side is formed with a laminate of two recording layers. The two recording layers can be optically accessed from one side of the DVD. A two-layer single-sided DVD of a write-once type uses organic dye films as recording layers. A two-layer single-sided DVD of a rewritable type uses phase change films as recording layers.

To record a signal on a DVD, a recording laser beam modulated in accordance with the signal is applied to the DVD. The quality of the recorded signal on the DVD depends on the power of the recording laser beam applied thereto. In general, a recording layer of a DVD has a power calibration area (PCA). Test recording and reproduction are performed on the DVD before a desired information signal is recorded thereon. During a first stage of the test recording and reproduction, test signals are sequentially recorded on the PCA in the DVD while the power of the recording laser beam is changed among different values. The test signals are assigned to the different powers of the recording laser beam, respectively. During a second stage of the test recording and reproduction, the recorded test signals are reproduced, and the reproduced test signals are evaluated. An optimum power of the recording laser beam is decided on the basis of the results of the evaluation of the reproduced test signals. During the recording of a desired information signal on the DVD which follows the test recording and reproduction, the recording laser beam is controlled at the decided optimum power.

In a two-layer single-sided DVD, the near recording layer is semitransparent while the far recording layer is reflective. During the recording of a signal on the near recording layer, a laser beam is focused thereon. During the recording of a signal on the far recording layer, the recording laser beam is applied thereto through the near recording layer. The application of the recording laser beam to the near recording layer to record a signal thereon changes the physical characteristics of the near recording layer from the original. Therefore, during the recording of a signal on the far recording layer, the intensity of the recording laser beam reaching the far recording layer depends on whether or not a portion of the near recording layer through which the recording laser beam passes has undergone signal recording. This fact makes it difficult to accurately decide an optimum power of the recording laser beam for the far recording layer.

In a two-layer single-sided DVD, the two recording layers are different in eccentricity with respect to the disc center. The eccentricity difference is disadvantageous to test recording and reproduction.

SUMMARY OF THE INVENTION

It is a first object of this invention to provide an information recording medium having a plurality of recording layers for which optimum powers of a recording laser beam can be accurately decided.

It is a second object of this invention to provide a method of recording a signal on an information recording medium which enables optimum powers of a recording laser beam to be accurately decided for a plurality of recording layers.

It is a third object of this invention to provide an apparatus for recording a signal on an information recording medium which enables optimum powers of a recording laser beam to be accurately decided for a plurality of recording layers.

It is a fourth object of this invention to provide an information recording medium which enables an eccentricity difference between recording layers to be properly dealt with.

It is a fifth object of this invention to provide a method of recording a signal on an information recording medium which enables an eccentricity difference between recording layers to be properly dealt with.

It is a sixth object of this invention to provide an apparatus for recording a signal on an information recording medium which enables an eccentricity difference between recording layers to be properly dealt with.

It is a seventh object of this invention to provide an improved method of recording and reproducing a signal on and from an information recording medium.

It is an eighth object of this invention to provide an improved apparatus for recording and reproducing a signal on and from an information recording medium.

A first aspect of this invention provides a disc-shaped information recording medium comprising a plurality of recording layers on and from which an information signal can be optically recorded and reproduced from one side of the medium; data areas provided in the recording layers respectively, wherein the information signal can be recorded on and reproduced from the data areas while a laser beam emitted from an optical pickup is applied to the data areas; and optical recording test areas provided in the recording layers respectively, wherein the optical recording test areas are out of overlap as viewed in a direction of propagation of the laser beam.

A second aspect of this invention provides a disc-shaped information recording medium comprising a plurality of recording layers on and from which an information signal can be optically recorded and reproduced from one side of the medium; data areas provided in the recording layers respectively, wherein the information signal can be recorded on and reproduced from the data areas while a laser beam emitted from an optical pickup is applied to the data areas; and optical recording test areas provided in the recording layers respectively; wherein the optical recording test areas are located in different radial positions in the medium respectively so as to be out of overlap as viewed in a direction of propagation of the laser beam, and the data areas are located in substantially equal radial positions in the medium respectively so as to substantially overlap as viewed in the direction of propagation of the laser beam.

A third aspect of this invention provides a disc-shaped information recording medium comprising a plurality of recording layers on and from which an information signal can be optically recorded and reproduced from one side of the medium, the recording layers including a first recording layer and a second recording layer which is remoter from an optical pickup than the first recording layer is; data areas provided in the recording layers respectively, wherein the information signal can be recorded on and reproduced from the data areas while a laser beam emitted from the optical pickup is applied to the data areas; optical recording test areas provided in the recording layers respectively, wherein the optical recording test areas are located in different radial positions in the medium respectively so as to be out of overlap as viewed in a direction of propagation of the laser beam; and a signal recording area greater in size than the optical recording test area in the second recording layer and provided in a portion of the first recording layer which is opposed to the optical recording test area in the second recording layer as viewed in the direction of propagation of the laser beam.

A fourth aspect of this invention provides a disc-shaped information recording medium comprising a plurality of recording layers on and from which an information signal can be optically recorded and reproduced from one side of the medium, the recording layers including a first recording layer and a second recording layer which is remoter from an optical pickup than the first recording layer is; data areas provided in the recording layers respectively, wherein the information signal can be recorded on and reproduced from the data areas while a laser beam emitted from the optical pickup is applied to the data areas; and optical recording test areas provided in the recording layers respectively; wherein the data areas are located in substantially equal radial positions in the medium respectively, and the data area in the first recording layer is greater in size than the data area in the second recording layer.

A fifth aspect of this invention provides a disc-shaped information recording medium comprising a plurality of recording layers on and from which an information signal can be optically recorded and reproduced from one side of the medium, the recording layers including a first recording layer and a second recording layer which is remoter from an optical pickup than the first recording layer is; data areas provided in the recording layers respectively, wherein the information signal can be recorded on and reproduced from the data areas while a laser beam emitted from the optical pickup is applied to the data areas; and optical recording test areas provided in the recording layers respectively, wherein the optical recording test areas are located in different radial positions in the medium respectively so as to be out of overlap as viewed in a direction of propagation of the laser beam; wherein the first recording layer has an area loaded with a signal in advance and opposed to the optical recording test area in the second recording layer as viewed in the direction of propagation of the laser beam.

A sixth aspect of this invention provides a method of recording a signal on a disc-shaped information recording medium comprising a plurality of recording layers on and from which an information signal can be optically recorded and reproduced from one side of the medium, the recording layers including a first recording layer and a second recording layer which is remoter from an optical pickup than the first recording layer is, data areas provided in the recording layers respectively, wherein the information signal can be recorded on and reproduced from the data areas while a laser beam emitted from the optical pickup is applied to the data areas, and optical recording test areas provided in the recording layers respectively. The method comprises the steps of a) recording a signal on an area in the first recording layer which is opposed to the optical recording test area in the second recording layer as viewed in a direction of propagation of the laser beam; and b) recording the test signal on the optical recording test area in the second recording layer after the step a).

A seventh aspect of this invention provides a method of recording a signal on a disc-shaped information recording medium comprising a plurality of recording layers on and from which an information signal can be optically recorded and reproduced from one side of the medium, data areas provided in the recording layers respectively, wherein the information signal can be recorded on and reproduced from the data areas while a laser beam emitted from the optical pickup is applied to the data areas, and optical recording test areas provided in the recording layers respectively. The method comprises the steps of a) modulating the laser beam in accordance with the test signal; and b) applying the modulated laser beam to places in the optical recording test areas to record the test signal thereon, wherein the places in the optical recording test areas are out of overlap as viewed in a direction of propagation of the modulated laser beam.

An eighth aspect of this invention provides a method of recording a signal on a disc-shaped information recording medium comprising a plurality of recording layers on and from which an information signal can be optically recorded and reproduced from one side of the medium, the recording layers including a first recording layer and a second recording layer which is remoter from an optical pickup than the first recording layer is, data areas provided in the recording layers respectively, wherein the information signal can be recorded on and reproduced from the data areas while a laser beam emitted from the optical pickup is applied to the data areas, and optical recording test areas provided in the recording layers respectively. The method comprises the steps of a) recording the test signal on the optical recording test area in the first recording layer along a first scanning direction; and b) recording the test signal on the optical recording test area in the second recording layer along a second scanning direction opposite to the first scanning direction.

A ninth aspect of this invention provides a method of recording and reproducing a signal on and from one of the disc-shaped information recording mediums in the first to fifth aspects of this invention, wherein the recording layers include a first recording layer and a second recording layer which is remoter from an optical pickup than the first recording layer is. The method comprises the steps of recording a first test signal on an optical recording test area in the first recording layer; reproducing the first test signal from the optical recording test area in the first recording layer; deciding a first optimum power value of a laser beam for signal recording on the first recording layer in response to the reproduced first test signal; recording first data on a data area in the first recording layer by using a laser beam having the decided first optimum power value; recording a signal on an area in the first recording layer by using a laser beam having the decided first optimum power value, wherein the area in the first recording layer is opposed to an optical recording test area in the second recording layer as viewed in a direction of propagation of a laser beam; recording a second test signal on the optical recording test area in the second recording layer after the signal is recorded on the area in the first recording layer; reproducing the second test signal from the optical recording test area in the second recording layer; deciding a second optimum power value of a laser beam for signal recording on the second recording layer in response to the reproduced second test signal; and recording second data on a data area in the second recording layer by using a laser beam having the decided second optimum power value.

A tenth aspect of this invention provides a method of recording and reproducing a signal on and from one of the disc-shaped information recording mediums in the first to fifth aspects of this invention, wherein the recording layers include a first recording layer and a second recording layer which is remoter from an optical pickup than the first recording layer is. The method comprises the steps of recording a first test signal on an optical recording test area in the first recording layer; reproducing the first test signal from the optical recording test area in the first recording layer; deciding a first optimum power value of a laser beam for signal recording on the first recording layer in response to the reproduced first test signal; recording first data on a data area in the first recording layer by using a laser beam having the decided first optimum power value; recording a first signal on a first area in the first recording layer by using a laser beam having the decided first optimum power value, wherein the first area in the first recording layer is opposed to an optical recording test area in the second recording layer as viewed in a direction of propagation of a laser beam; recording a second test signal on the optical recording test area in the second recording layer after the first signal is recorded on the first area in the first recording layer; reproducing the second test signal from the optical recording test area in the second recording layer; deciding a second optimum power value of a laser beam for signal recording on the second recording layer in response to the reproduced second test signal; recording second data on a data area in the second recording layer by using a laser beam having the decided second optimum power value; and recording a second signal on second areas in the first and second recording layers which extend outward of the data areas.

An eleventh aspect of this invention provides an apparatus for recording a signal on an optical disc including first and second recording layers. The apparatus comprises means for recording a test signal on a first area in the first recording layer while applying a laser beam to the first area; means for recording a non-test signal on a second area in the first recording layer while applying the laser beam to the second area, the second area being separate from the first area; and means for recording the test signal on a third area in the second recording layer while applying the laser beam to the third area through the second area after the non-test signal is recorded on the second area.

A twelfth aspect of this invention provides an apparatus for recording and reproducing a signal on and from an optical disc including first and second recording layers. The apparatus comprises means for recording a first test signal on a first area in the first recording layer while applying a laser beam with a variable power to the first area; means for reproducing the first test signal from the first area; means for deciding a first optimum power value of the laser beam for signal recording on the first recording layer in response to the reproduced first test signal; means for recording first data on a second area in the first recording layer while applying the laser beam having the decided first optimum power value to the second area, the second area being separate from the first area; means for recording a non-test signal on a third area in the first recording layer while applying the laser beam having the decided first optimum power value to the third area, the third area being separate from the first and second areas; means for recording a second test signal on a fourth area in the second recording layer while applying the laser beam with a variable power to the fourth area through the third area after the non-test signal is recorded on the third area; means for reproducing the second test signal from the fourth area; means for deciding a second optimum power value of the laser beam for signal recording on the second recording layer in response to the reproduced second test signal; and means for recording second data on a fifth area in the second recording layer while applying the laser beam having the decided second optimum power value to the fifth area, the fifth area being separate from the fourth area.

A thirteenth aspect of this invention is based on the first aspect thereof, and provides a disc-shaped information recording medium wherein a test signal can be recorded on and reproduced from the optical recording test areas to decide optimum power values of the laser beam for signal recording.

A fourteenth aspect of this invention is based on the second aspect thereof, and provides a disc-shaped information recording medium wherein a test signal can be recorded on and reproduced from the optical recording test areas to decide optimum power values of the laser beam for signal recording.

A fifteenth aspect of this invention is based on the third aspect thereof, and provides a disc-shaped information recording medium wherein a test signal can be recorded on and reproduced from the optical recording test areas to decide optimum power values of the laser beam for signal recording.

A sixteenth aspect of this invention is based on the fourth aspect thereof, and provides a disc-shaped information recording medium wherein a test signal can be recorded on and reproduced from the optical recording test areas to decide optimum power values of the laser beam for signal recording.

A seventeenth aspect of this invention is based on the fifth aspect thereof, and provides a disc-shaped information recording medium wherein a test signal can be recorded on and reproduced from the optical recording test areas to decide optimum power values of the laser beam for signal recording.

This invention provides advantages as follows. A disc-shaped information recoding medium of this invention includes a first recording layer and a second recording layer which is remoter from an optical pickup than the first recording layer is. Before a test signal is recorded on an optical recording test area in the second recording layer, a non-test signal can be recorded on an area in the first recording layer which is opposed to the optical recording test area in the second recording layer. Therefore, after the recording of data on the first recording layer and the recording of the non-test signal on the area in the first recording layer which is opposed to the optical recording test area in the second recording layer, it is possible to stably and accurately decide an optimum power value of a laser beam for signal recording on the second recording layer since a laser beam passes through a first-recording-layer portion uniformly loaded with the non-test signal and then reaches the second recording layer.

A disc-shaped information recoding medium of this invention includes a first recording layer and a second recording layer which is remoter from an optical pickup than the first recording layer is. The first and second recording layers have respective data areas located at substantially equal positions as viewed in a direction of propagation of a laser beam. First data can be recorded on the data area in the first recording layer before second data is recorded on the data area in the second recording layer. Thus, it is possible to implement the recording of the second data on the data area in the second recording layer under constant recording conditions since the laser beam passes through a first-recording-layer portion uniformly loaded with the first data and then reaches the second recording layer.

A disc-shaped information recoding medium of this invention includes a first recording layer and a second recording layer which is remoter from an optical pickup than the first recording layer is. The first and second recording layers have respective data areas located at substantially equal positions as viewed in a direction of propagation of a laser beam. The first recording layer has a predetermined area. The data area in the first recording layer and the predetermined area therein constitute a prescribed area on which data is recorded. Alternatively, the size of the data area in the first recording layer may be greater than that of the data area in the second recording layer. Thus, during the recording of data on the data area in the second recording layer, a laser beam always passes through a portion of the first recording layer which has been already uniformly loaded with data even in the presence of a track eccentricity. Accordingly, the recording of the data on the data area in the second recording layer can be stably implemented under constant recording conditions even in the presence of a track eccentricity.

DETAILED DESCRIPTION OF THE INVENTION

Prior-art information recording mediums will be explained below for a better understanding of this invention.

Figure 1:
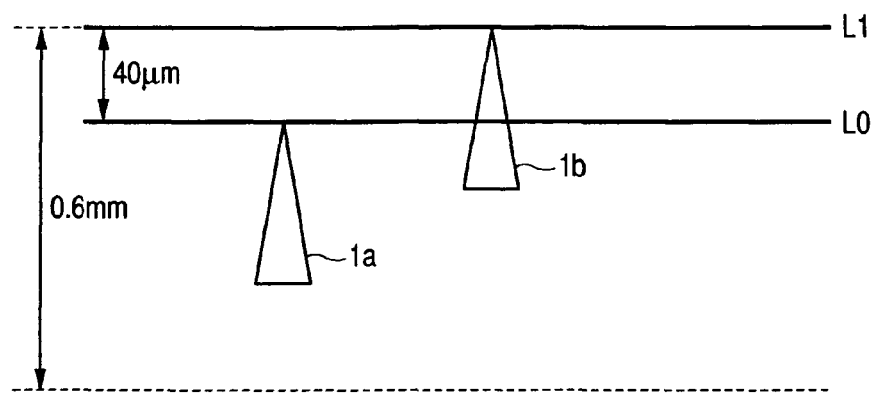
FIG. 1 is a sectional diagram of a prior-art DVD of a two-layer single-sided type.

FIG. 1 shows a prior-art DVD of a two-layer single-sided type. As shown in FIG. 1, the prior-art DVD is, for example, 0.6 mm thick. The prior-art DVD of FIG. 1 has a disc substrate, one side of which is formed with first and second radially-extending recording layers L0 and L1 parallel to each other. The first and second recording layers L0 and L1 are spaced 40 µm apart in an axial direction. The space between the first and second recording layer L0 and L1 is occupied by a transparent layer. The first and second recording layers L0 and L1 are near and far recording layers, respectively. In FIG. 1, the second recording layer L1 is located above the first recording layer L0, and a protective transparent member extends below the first recording layer L0.

The first recording layer L0 is made of semitransparent resin. The first recording layer L0 is an organic dye film or a phase change film. The second recording layer L1 is a reflective film formed by an organic dye film or a phase change film.

A prior-art DVD drive having an optical pickup records and reproduces an information signal on and from the prior-art DVD of FIG. 1 as follows. Firstly, the optical pickup records or reproduces an information signal on or from the first recording layer L0 while focusing an axially-propagating laser beam 1a thereon. When the recording or reproduction of the information signal on or from the first recording layer L0 has been completed, the optical pickup moves an internal objective lens to focus the laser beam on the second recording layer L1 instead of the first recording layer L0. Subsequently, the optical pickup records or reproduces the information signal on or from the second recording layer L1 while focusing the laser beam 1b thereon. At this time, the laser beam 1b passes through the first recording layer L0 before reaching the second recording layer L1.

In the case where both the first and second recording layers L0 and L1 are organic dye films, the recording of the information signal on the first recording layer L0 changes the refractive index of the first recording layer L0 and causes the first recording layer L0 to absorb heat. The heat absorption deforms the first recording layer L0. In addition, the heat absorption changes the light transmittance of the first recording layer L0. These changes in the physical characteristics of the first recording layer L0 vary the amount of the laser light reaching the second recording layer L0 through the first recording layer L0 from that occurring before the information signal is recorded on the first recording layer L0. The amount of the laser light reflected by and returned from the prior-art DVD is varied also.

Figure 2:
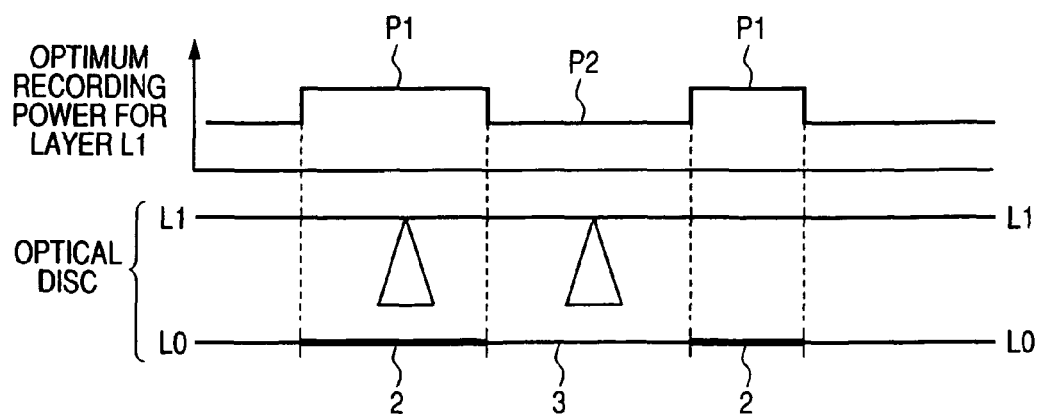
FIG. 2 is a diagram of the relation between a condition of the prior-art DVD in FIG. 1 and an optimum recording laser power for far one of two recording layers in the prior-art DVD.

With reference to FIG. 2, it is assumed that the first recording layer L0 has used portions 2 and unused portions 3. The used portions 2 mean portions on which an information signal has been recorded. The unused portions 3 mean portions on which any information signal has not been recorded yet. The physical characteristics of the used portions 2 differ from those of the unused portions 3. Therefore, the amount of the laser light reaching the second recording layer L1 through the first recording layer L0 depends on which of a used portion 2 and an unused portion 3 the laser light passes. Accordingly, an optimum power of the recording laser beam to record an information signal on the second recording layer L1 depends on which of a used portion 2 and an unused portion 3 the recording laser beam passes. In other words, an optimum power P1 of the recording laser beam for a portion of the second recording layer L1 directly above a used portion 2 of the first recording layer L0 differs from an optimum power P2 of the recording laser beam for a portion of the second recording layer L1 directly above a unused portion 3 of the first recording layer L0. Furthermore, a desired recording strategy of the laser beam (that is, a desired recording laser emission waveform or timing) to record an information signal on the second recording layer L1 depends on which of a used portion 2 and an unused portion 3 the laser light passes. In addition, the diffractive index of the used portions 2 differ from that of the unused portions 3 so that an optimum laser beam focus position depends on which of a used portion 2 and an unused portion 3 the recording laser beam passes.

Figure 3:
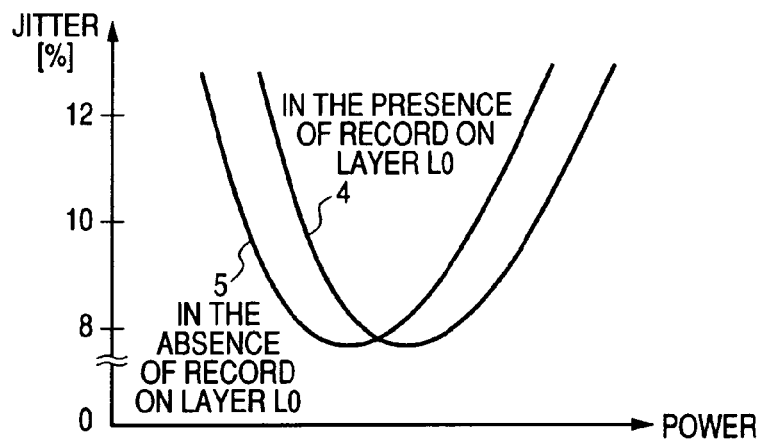
FIG. 3 is a diagram of the relation among the jitter of an information signal reproduced from the far recording layer, the power of the recording laser beam at the time of the recording of the information signal on the far recording layer, and the presence or absence of another information signal recorded on the near recording layer in the prior-art DVD of FIG. 1.

With reference to FIG. 3, in the case where a first information signal is recorded on the first recording layer L0 before a second information signal is recorded on the second recording layer L1, the jitter of the second information signal reproduced from the second recording layer L1 varies along the curve 4 as the power of the recording laser beam at the time of the recording of the second information signal changes. On the other hand, in the case where any information signal is not recorded on the first recording layer L0 before an information signal is recorded on the second recording layer L1, the jitter of the information signal reproduced from the second recording layer L1 varies along the curve 5 as the power of the recording laser beam at the time of the recording of the information signal changes. As shown in FIG. 3, the power-jitter characteristic curves 4 and 5 are different. Therefore, a jitter-based optimum power of the recording laser beam for the second recording layer L1 depends on whether or not an information signal has been recorded on the first recording layer L0 before signal recording on the second recording layer L1. In addition, the amount of the laser light reflected by and returned from the second recording layer L1 depends on whether or not an information signal has been recorded on the first recording layer L0. Therefore, optimum conditions of the laser beam to reproduce address signals and data from the second recording layer L1 depend on whether or not an information signal has been recorded on the first recording layer L0.

The first recording layer L0 is semitransparent while the second recording layer L1 is reflective. Thus, the thermal conductivity and the heat absorption factor of the first recording layer L0 differ from those of the second recording layer L1. Accordingly, the first and second recording layers L0 and L1 are different in recording-related characteristics.

Figure 4:
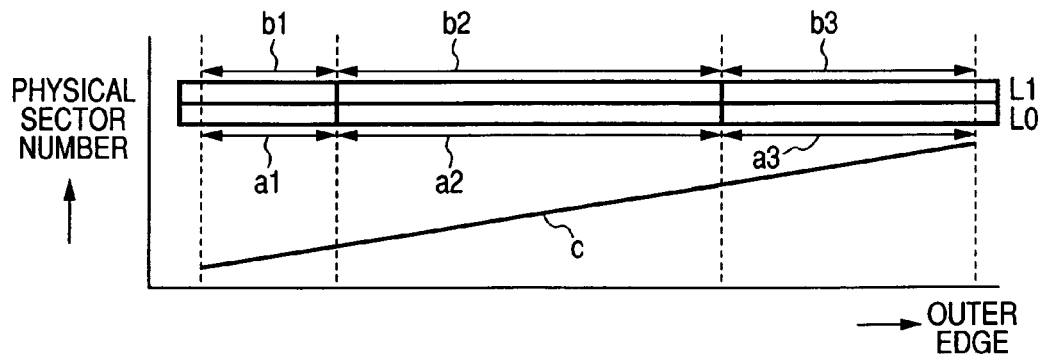
FIG. 4 is a sectional diagram of a prior-art optical disc of a two-layer single-sided type which has a parallel structure related to two recording layers.

FIG. 4 shows a prior-art optical disc of a two-layer single-sided type which has a parallel structure related to first and second recording layers L0 and L1. The prior-art optical disc of FIG. 4 has a central opening for accommodating a spindle motor shaft, and has an inner circumferential edge and an outer circumferential edge (also referred to as an inner edge and an outer edge). In the prior-art optical disc of FIG. 4, the first recording layer L0 has a lead-in area a1, a data area a2, and a lead-out area a3 which are successively arranged in that order along the direction from the inner edge to the outer edge of the disc. Similarly, the second recording layer L1 has a lead-in area b1, a data area b2, and a lead-out area b3 which are successively arranged in that order along the direction from the inner edge to the outer edge of the disc. The first and second recording layers L0 and L1 are formed with tracks divided into physical sectors assigned different ID numbers (serial address numbers) respectively. In each of the first and second recording layers L0 and L1, the ID number of a physical sector at a position on the disc increases along the line "c" as the position moves from the inner edge toward the outer edge of the disc.

Figure 5:
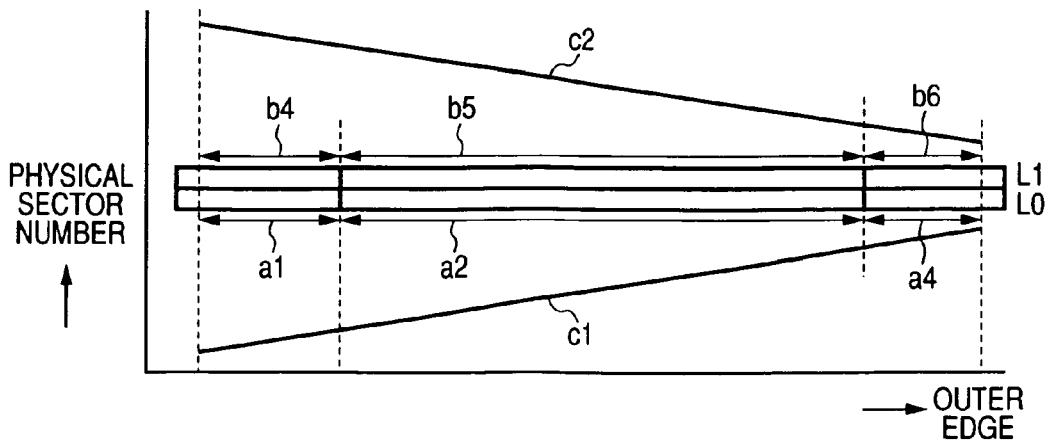
FIG. 5 is a sectional diagram of a prior-art optical disc of a two-layer single-sided type which has an opposite structure related to two recording layers.

FIG. 5 shows a prior-art optical disc of a two-layer single-sided type which has an opposite structure related to first and second recording layers L0 and L1. The prior-art optical disc of FIG. 5 has a central opening for accommodating a spindle motor shaft, and has an inner circumferential edge and an outer circumferential edge (also referred to as an inner edge and an outer edge). In the prior-art optical disc of FIG. 5, the first recording layer L0 has a lead-in area a1, a data area a2, and a middle area a4 which are successively arranged in that order along the direction from the inner edge to the outer edge of the disc. On the other hand, the second recording layer L1 has a lead-out area b4, a data area b5, and a middle area b6 which are successively arranged in that order along the direction from the inner edge to the outer edge of the disc. The first and second recording layers L0 and L1 are formed with tracks divided into physical sectors assigned different ID numbers (serial address numbers) respectively. In the first recording layer L0, the ID number of a physical sector at a position on the disc increases along the line c1 as the position moves from the inner edge toward the outer edge of the disc. Conversely, in the second recording layer L1, the ID number of a physical sector at a position on the disc decreases along the line c2 as the position moves from the inner edge toward the outer edge of the disc.

It should be noted that a signal recording direction or a disc scanning direction corresponds to the direction in which the physical sector ID number increases.

To record a signal on a prior-art DVD, a recording laser beam modulated in accordance with the signal is applied to the DVD. The quality of the recorded signal on the DVD depends on the power of the recording laser beam applied thereto. In general, a recording layer of the DVD has a power calibration area (PCA). Test recording and reproduction are performed on the DVD before a desired information signal is recorded thereon. During a first stage of the test recording and reproduction, test signals are sequentially recorded on the PCA in the DVD while the power of the recording laser beam is changed among different values. The test signals are assigned to the different powers of the recording laser beam, respectively. During a second stage of the test recording and reproduction, the recorded test signals are reproduced, and the reproduced test signals are evaluated. The evaluation of the reproduced test signals is based on the measurement of the asymmetry values thereof. One among the different powers of the recording laser beam which corresponds to the measured asymmetry value equal to or substantially equal to a target asymmetry value is designated as an optimum power of the recording laser beam. During the recording of a desired information signal on the DVD which follows the test recording and reproduction, the recording laser beam is controlled at the optimum power. The evaluation of the reproduced test signals may be based on the measurement of the jitter-based error rates thereof. In this case, one among the different powers of the recording laser beam which corresponds to the smallest measured error rate is designated as an optimum power of the recording laser beam.

It is conceivable to provide first and second recording layers L0 and L1 in a two-layer single-sided optical disc with PCAs respectively. The recording of test signals on the PCA in the first recording layer L0 at respective different powers of the recording laser beam causes the refractive index of the PCA in the first recording layer L0 to vary from place to place. It is assumed that the PCA in the first recording layer L0 is opposed to or aligned with the PCA in the second recording layer L1 as viewed in a direction along the optical axis with respect to a laser beam. In this case, during the recording of test signals on the PCA in the second recording layer L1 which follows the recording of test signals on the PCA in the first recording layer L0, the amount of the laser light reaching the second recording layer L1 via the first recording layer L0 depends on a position in the PCA in the first recording layer L0 through which the laser light passes since the refractive index of the PCA in the first recording layer L0 varies from place to place. Accordingly, it is difficult to accurately decide an optimum power of the recording laser beam for the second recording layer L1.

It is assumed that the PCA in the first recording layer L0 has a used portion and an unused portion. The used portion means a portion on which test signals have been recorded. The unused portion means a portion on which any test signals have not been recorded yet. For a reason similar to the above-mentioned one, a portion of the second recording layer L1 which is opposed to the used portion of the first recording layer L0 is unfit for use to decide an optimum power of the recording laser beam for the second recording layer L1. Accordingly, there is a strict limitation on a portion of the second recording layer L1 which can be used to decide a related optimum power of the recording laser beam.

Regarding a two-layer single-sided optical disc, first and second recording layers L0 and L1 are made at different stages respectively. A track on each of the first and second recording layers L0 and L1 has an eccentricity of about ±40 μm with respect to the disc center. The track pitch in each of the first and second recording layers L0 and L1 is equal to, for example, 0.74 μm. Accordingly, in the case where a PCA in the second recording layer L1 is opposed to a PCA in the first recording layer L0 and the eccentricities of the tracks on the first and second recording layers L0 and L1 are considered, the PCA in the second recording layer L1 is required to have a size of 108 (≈40·2/0.74) track turns to implement test recording thereon under conditions similar to those of test recording on the PCA in the first recording layer L0. Thus, in this case, the PCA in the second recording layer L1 occupies a relatively large area.

First Embodiment

Figure 6:
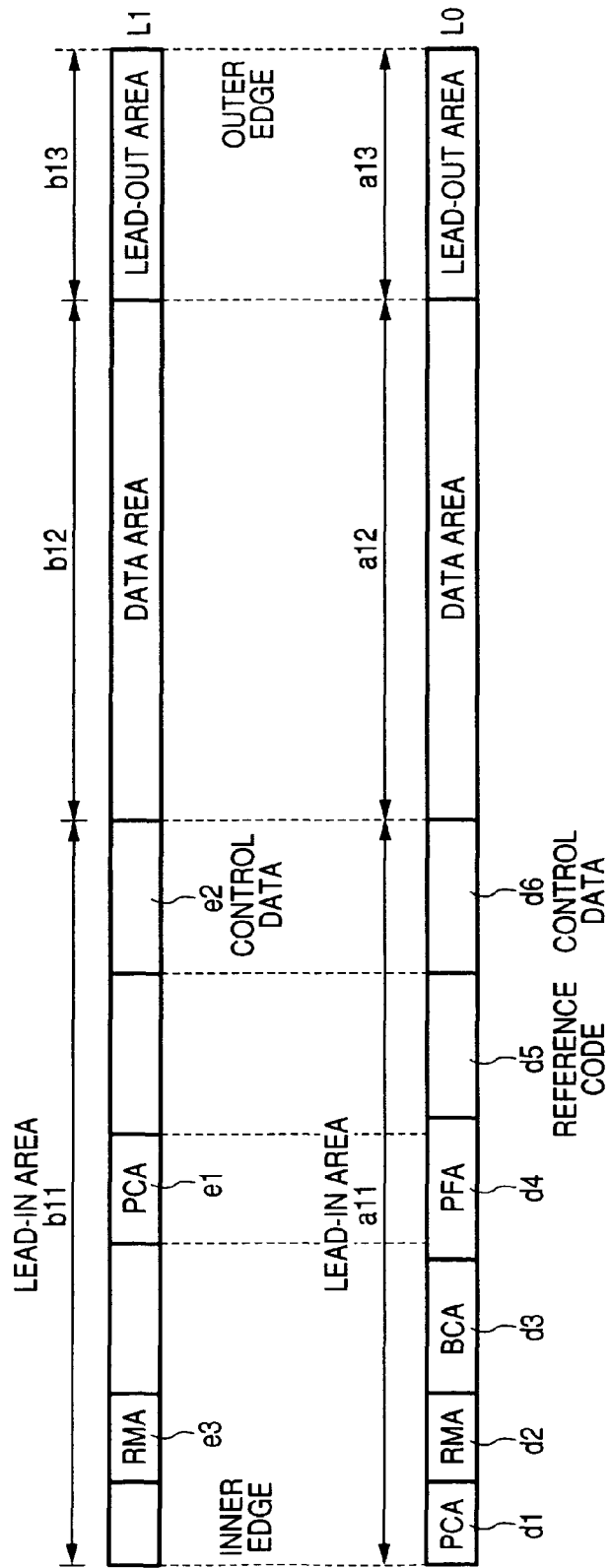
FIG. 6 is a sectional diagram of an information recording medium according to a first embodiment of this invention.

FIG. 6 shows an information recording medium or an optical disc according to a first embodiment of this invention. The optical disc of FIG. 6 includes a laminate of a first recording layer L0, a transparent layer, and a second recording layer L1 successively arranged in that order. The first recording layer L0 is a semitransparent reflective film. The second recording layer L1 is a reflective film. The transparent layer extends between the first recording layer L0 and the second recording layer L1. The transparent layer has a thickness of, for example, about 40 μm.

The optical disc in FIG. 6 is of a two-layer single-sided type which has a parallel structure related to the first and second recording layers L0 and L1. The first and second recording layers L0 and L1 extend radially with respect to the disc. The first and second recording layers L0 and L1 can be accessed from one side of the disc.

The optical disc of FIG. 6 has a central opening for accommodating a spindle motor shaft, and has an inner circumferential edge and an outer circumferential edge (also referred to as an inner edge and an outer edge). In the optical disc of FIG. 6, the first recording layer L0 has a lead-in area a11, a data area a12, and a lead-out area a13 which are successively arranged in that order along the direction from the inner edge to the outer edge of the disc. Similarly, the second recording layer L1 has a lead-in area b11, a data area b12, and a lead-out area b13 which are successively arranged in that order along the direction from the inner edge to the outer edge of the disc. The first and second recording layers L0 and L1 are formed with tracks divided into physical sectors assigned different ID numbers (serial address numbers) respectively. In each of the first and second recording layers L0 and L1, the ID number of a physical sector at a position on the disc increases as the position moves from the inner edge toward the outer edge of the disc. Furthermore, in each of the first and second recording layers L0 and L1, land pre-pit information (LPP information) is recorded on wobbles of the track as address information. The LPP information represents a value (an address value) indicative of the address of a related point in the recording layer.

It should be noted that a signal recording direction or a disc scanning direction corresponds to the direction in which the physical sector ID number increases.

As shown in FIG. 6, the lead-in area a11 in the first recording layer L0 has a power calibration area (PCA) d1, a recording management area (RMA) d2, a burst cutting area (BCA) d3, a physical format area (PFA) d4, a reference code area d5, and a control data area d6 which are successively arranged in that order along the direction from the inner edge to the outer edge of the disc.

The lead-in area b11 in the second recording layer L1 includes a PCA e1 and a control data area e2. The PCA e1 is located inward of the control data area e2. The lead-in area b11 may include an RMA e3. Preferably, the RMA e3 is located inward of the PCA e1.

The PCA d1 and the PCA e1 are test areas used for the recording and reproduction of test signals. The RMA d2 and the RMA e3 are used to store address information about the PCA d1 and the PCA e1, and also information representing optimum recording laser powers for the first and second recording layers L0 and L1 which have been decided by test recording and reproduction. The address information about the PCA d1 and the PCA e1 includes PCA-use address information which represents the addresses of the portion of the PCA d1 which has been used or occupied, the position of the boundary between the used portion and the usable portion of the PCA d1, the addresses of the portion of the PCA e1 which has been used or occupied, and the position of the boundary between the used portion and the usable portion of the PCA e1.

In the case where the second recording layer L1 has the RMA e3, when the RMA d2 in the first recording layer L0 is insufficient to store the whole of assigned information, not only the RMA d2 but also the RMA e3 is used to store the assigned information. On the other hand, when the RMA d2 in the first recording layer L0 is sufficient to store the whole of assigned information, only the RMA d2 is used. A recording and reproducing apparatus or a disc drive apparatus reproduces information from the RMA d2 in the first recording layer L0 at the start of the disc. The disc drive apparatus may reproduce information from both the RMA d2 in the first recording layer L0 and the RMA e3 in the second recording layer L1. The disc drive apparatus determines whether or not the reproduced information represents all optimum recording laser powers for the first and second recording layers L0 and L1. When the reproduced information represents all optimum recording laser powers for the first and second recording layers L0 and L1, the disc drive apparatus derives the optimum recording laser powers for the first and second recording layers L0 and L1 from the reproduced information. Thus, in this case, it is unnecessary for the disc drive apparatus to access the RMA e3 in the second recording layer L1. Accordingly, it is possible to shorten a disc starting time.

The BCA d3 in the first recording layer L0 has a circumferentially-extending bar code formed by a YAG laser. The bar code represents key information peculiar to the disc. The reference code area d5 in the first recording layer L0 is used to store a reference code. The control data areas d6 and e2 in the first and second recording layers L0 and L1 store information about the specifications of the disc. The disc specification information is control data. For example, the disc specification information in the control data areas d6 and e2 has a piece representing whether the disc is a DVD-R, a DVD-RW, or a DVD-RAM, a piece representing whether the disc has a single recording layer or two recording layers, a piece representing whether or not the disc has a BCA, and a piece representing whether or not contents information recorded on the disc is copyrighted. The disc specification information (the control data) is recorded on the control data areas d6 and e2 before the disc is shipped from the factory.

As shown in FIG. 6, the PCA d1 in the first recording layer L0 and the PCA e1 in the second recording layer L1 do not overlap each other as viewed in the axial direction of the disc, that is, the direction perpendicular to the major surfaces of the disc or the direction of the propagation of the laser beam. In other words, the PCA d1 and the PCA e1 are located at different and separate radial positions, respectively. The physical format area d4 in the first recording layer L0 overlaps and covers the PCA e1 in the second recording layer L1 as viewed in the axial direction of the disc (that is, the direction perpendicular to the major surfaces of the disc or the direction of the propagation of the laser beam). Furthermore, the physical format area d4 also covers circumferential zones adjoining the inner and outer edges (sides) of the PCA e1 and each having a size corresponding to greater than a track eccentricity with respect to the disc center. Thus, the physical format area d4 is larger than the PCA e1. The data area a12 in the first recording layer L0 and the data area b12 in the second recording layer L1 are substantially opposed to or aligned with each other as viewed in the axial direction of the disc. In other words, the data areas a12 and b12 are located at substantially equal radial positions, respectively.

As previously mentioned, the control data area d6 in the first recording layer L0 and the control data area e2 in the second recording layer L1 store the control data in advance. The disc drive apparatus (the recording and reproducing apparatus) loads the physical format area d4 in the first recording layer L0 with the control data same as that in the control data areas d6 and e2 before recording test signals on the PCA e1 in the second recording layer L1. Since the physical format area d4 covers the PCA e1 as previously mentioned, the recording and reproduction of test signals on and from the PCA e1 are implemented by a laser beam passing through the physical format area d4. In this case, since the physical format area d4 already stores the control data, the power of the laser beam and the reflectivity can be in desired constant conditions due to the fact that the laser beam passes through a recording layer portion which has been uniformly loaded with data.

Second Embodiment

Figure 7:
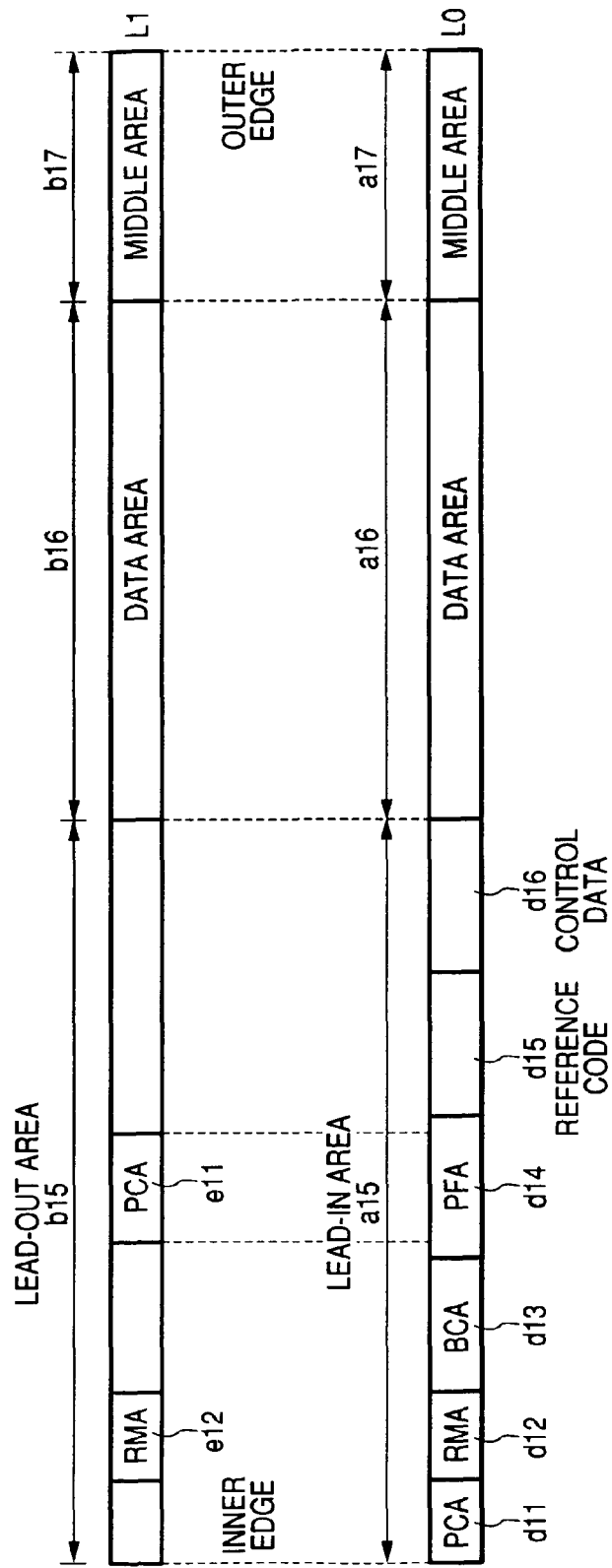
FIG. 7 is a sectional diagram of an information recording medium according to a second embodiment of this invention.

FIG. 7 shows an information recording medium or an optical disc according to a second embodiment of this invention. The optical disc of FIG. 7 includes a laminate of a first recording layer L0, a transparent layer, and a second recording layer L1 successively arranged in that order. The first recording layer L0 is a semitransparent reflective film. The second recording layer L1 is a reflective film. The transparent layer extends between the first recording layer L0 and the second recording layer L1. The transparent layer has a thickness of, for example, about 40 μm.

The optical disc in FIG. 7 is of a two-layer single-sided type which has an opposite structure related to the first and second recording layers L0 and L1. The first and second recording layers L0 and L1 extend radially with respect to the disc. The first and second recording layers L0 and L1 can be accessed from one side of the disc.

The optical disc of FIG. 7 has a central opening for accommodating a spindle motor shaft, and has an inner circumferential edge and an outer circumferential edge (also referred to as an inner edge and an outer edge). In the optical disc of FIG. 7, the first recording layer L0 has a lead-in area a15, a data area a16, and a middle area a17 which are successively arranged in that order along the direction from the inner edge to the outer edge of the disc. On the other hand, the second recording layer L1 has a lead-out area b15, a data area b16, and a middle area b17 which are successively arranged in that order along the direction from the inner edge to the outer edge of the disc. The first and second recording layers L0 and L1 are formed with tracks divided into physical sectors assigned different ID numbers (serial address numbers) respectively. In the first recording layer L0, the ID number of a physical sector at a position on the disc increases as the position moves from the inner edge toward the outer edge of the disc. Conversely, in the second recording layer L1, the ID number of a physical sector at a position on the disc decreases as the position moves from the inner edge toward the outer edge of the disc. Furthermore, in each of the first and second recording layers L0 and L1, land pre-pit information (LPP information) is recorded on wobbles of the track as address information. The LPP information represents a value (an address value) indicative of the address of a related point in the recording layer.

It should be noted that a signal recording direction or a disc scanning direction corresponds to the direction in which the physical sector ID number increases.

As shown in FIG. 7, the lead-in area a15 in the first recording layer L0 has a power calibration area (PCA) d11, a recording management area (RMA) d12, a burst cutting area (BCA) d13, a physical format area (PFA) d14, a reference code area d15, and a control data area d16 which are successively arranged in that order along the direction from the inner edge to the outer edge of the disc.

The lead-out area b15 in the second recording layer L1 includes a PCA e11. The lead-out area b15 may include an RMA e12. Preferably, the RMA e12 is located inward of the PCA e11.

The PCA d11 and the PCA e11 are test areas used for the recording and reproduction of test signals. The RMA d12 and the RMA e12 are used to store address information about the PCA d11 and the PCA e11, and also information representing optimum recording laser powers for the first and second recording layers L0 and L1 which have been decided by test recording and reproduction. The address information about the PCA d11 and the PCA e11 includes PCA-use address information which represents the addresses of the portion of the PCA d11 which has been used or occupied, the position of the boundary between the used portion and the usable portion of the PCA d11, the addresses of the portion of the PCA e11 which has been used or occupied, and the position of the boundary between the used portion and the usable portion of the PCA e11.

In the case where the second recording layer L1 has the RMA e12, when the RMA d12 in the first recording layer L0 is insufficient to store the whole of assigned information, not only the RMA d12 but also the RMA e12 is used to store the assigned information. On the other hand, when the RMA d12 in the first recording layer L0 is sufficient to store the whole of assigned information, only the RMA d12 is used. A recording and reproducing apparatus or a disc drive apparatus reproduces information from the RMA d12 in the first recording layer L0 at the start of the disc. The disc drive apparatus may reproduce information from both the RMA d12 in the first recording layer L0 and the RMA e12 in the second recording layer L1. The disc drive apparatus determines whether or not the reproduced information represents all optimum recording laser powers for the first and second recording layers L0 and L1. When the reproduced information represents all optimum recording laser powers for the first and second recording layers L0 and L1, the disc drive apparatus derives the optimum recording laser powers for the first and second recording layers L0 and L1 from the reproduced information. Thus, in this case, it is unnecessary for the disc drive apparatus to access the RMA e12 in the second recording layer L1. Accordingly, it is possible to shorten a disc starting time.

The BCA d13 in the first recording layer L0 has a circumferentially-extending bar code formed by a YAG laser. The bar code represents key information peculiar to the disc. The reference code area d15 in the first recording layer L0 is used to store a reference code. The control data area d16 in the first recording layer L0 stores information about the specifications of the disc. The disc specification information is control data. For example, the disc specification information in the control data areas d16 has a piece representing whether the disc is a DVD-R, a DVD-RW, or a DVD-RAM, a piece representing whether the disc has a single recording layer or two recording layers, a piece representing whether or not the disc has a BCA, and a piece representing whether or not contents information recorded on the disc is copyrighted. The disc specification information (the control data) is recorded on the control data area d16 before the disc is shipped from the factory.

As shown in FIG. 7, the PCA d11 in the first recording layer L0 and the PCA e11 in the second recording layer L1 do not overlap each other as viewed in the axial direction of the disc, that is, the direction perpendicular to the major surfaces of the disc or the direction of the propagation of the laser beam. In other words, the PCA d11 and the PCA e11 are located at different and separate radial positions, respectively. The physical format area d14 in the first recording layer L0 overlaps and covers the PCA e11 in the second recording layer L1 as viewed in the axial direction of the disc (that is, the direction perpendicular to the major surfaces of the disc or the direction of the propagation of the laser beam). Furthermore, the physical format area d14 also covers circumferential zones adjoining the inner and outer edges (sides) of the PCA e11 and each having a size corresponding to greater than a track eccentricity with respect to the disc center. Thus, the physical format area d14 is larger than the PCA e11. The data area a16 in the first recording layer L0 and the data area b16 in the second recording layer L1 are substantially opposed to or aligned with each other as viewed in the axial direction of the disc. In other words, the data areas a16 and b16 are located at substantially equal radial positions, respectively.

As previously mentioned, the control data area d16 in the first recording layer L0 stores the control data in advance. The disc drive apparatus (the recording and reproducing apparatus) loads the physical format area d14 in the first recording layer L0 with the control data same as that in the control data area d16 before recording test signals on the PCA e11 in the second recording layer L1. Since the physical format area d14 covers the PCA e11 as previously mentioned, the recording and reproduction of test signals on and from the PCA e11 are implemented by a laser beam passing through the physical format area d14. In this case, since the physical format area d14 already stores the control data, the power of the laser beam and the reflectivity can be in desired constant conditions due to the fact that the laser beam passes through a recording layer portion which has been uniformly loaded with data.

While the first recording layer L0 includes the control data area d16, the second recording layer L1 does not have a corresponding control data area. Since the optical disc of FIG. 7 has the opposite structure related to the first and second recording layers L0 and L1, the first and second recording layers L0 and L1 are handled as a single recording layer during the drive of the disc by the recording and reproducing apparatus. Thus, in the optical disc of FIG. 7, only one control data area suffices.

Third Embodiment

Figure 8:
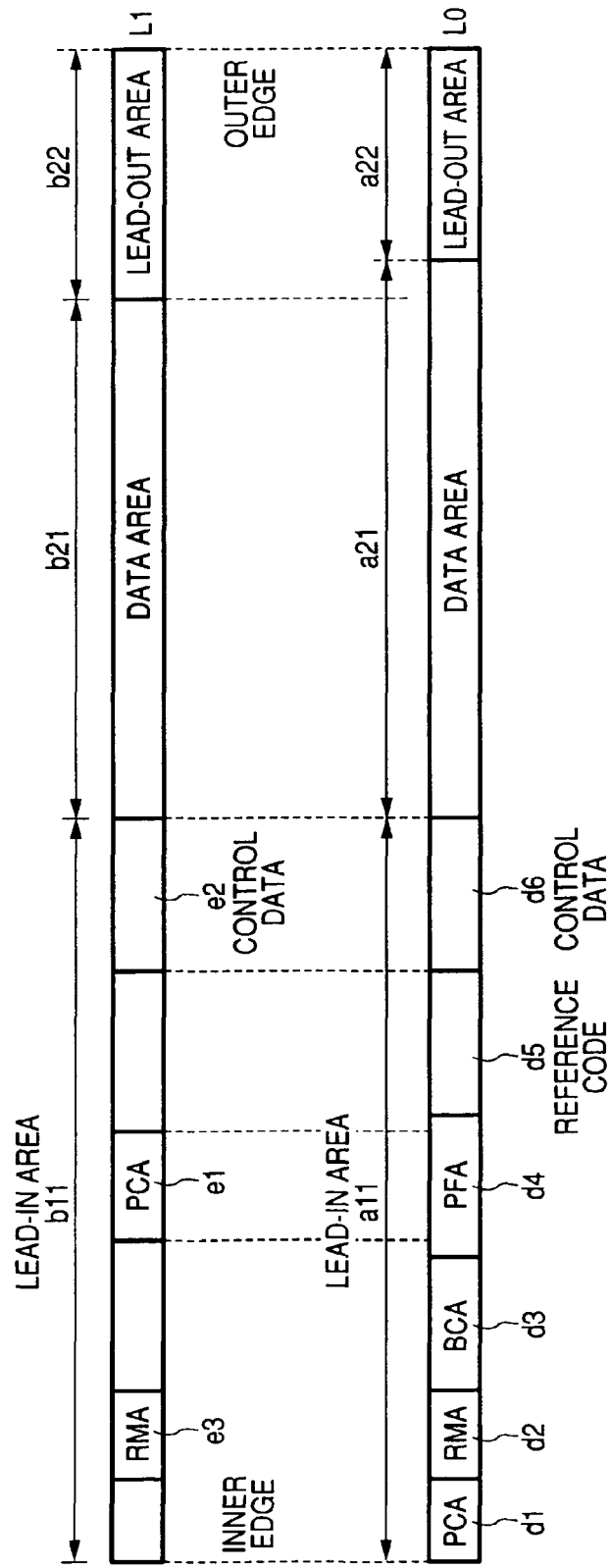
FIG. 8 is a sectional diagram of an information recording medium according to a third embodiment of this invention.

FIG. 8 shows an information recording medium or an optical disc according to a third embodiment of this invention. The optical disc of FIG. 8 includes a laminate of a first recording layer L0, a transparent layer, and a second recording layer L1 successively arranged in that order. The first recording layer L0 is a semitransparent reflective film. The second recording layer L1 is a reflective film. The transparent layer extends between the first recording layer L0 and the second recording layer L1. The transparent layer has a thickness of, for example, about 40 μm.

The optical disc in FIG. 8 is of a two-layer single-sided type which has a parallel structure related to the first and second recording layers L0 and L1. The first and second recording layers L0 and L1 extend radially with respect to the disc. The first and second recording layers L0 and L1 can be accessed from one side of the disc.

The optical disc of FIG. 8 has a central opening for accommodating a spindle motor shaft, and has an inner circumferential edge and an outer circumferential edge (also referred to as an inner edge and an outer edge). In the optical disc of FIG. 8, the first recording layer L0 has a lead-in area a11, a data area a21, and a lead-out area a22 which are successively arranged in that order along the direction from the inner edge to the outer edge of the disc. Similarly, the second recording layer L1 has a lead-in area b11, a data area b21, and a lead-out area b22 which are successively arranged in that order along the direction from the inner edge to the outer edge of the disc. The first and second recording layers L0 and L1 are formed with tracks divided into physical sectors assigned different ID numbers (serial address numbers) respectively. In each of the first and second recording layers L0 and L1, the ID number of a physical sector at a position on the disc increases as the position moves from the inner edge toward the outer edge of the disc. Furthermore, in each of the first and second recording layers L0 and L1, land pre-pit information (LPP information) is recorded on wobbles of the track as address information. The LPP information represents a value (an address value) indicative of the address of a related point in the recording layer.

The lead-in areas a11 and b11 in FIG. 8 are similar to those in FIG. 6. The data area a21 in the first recording layer L0 is greater in size than the data area b21 in the second recording layer L1 by a value corresponding to at least a track eccentricity with respect to the disc center. Thus, the outer circumferential edge of the data area a21 is located outward of the outer circumferential edge of the data area b21. The data area a21 covers the whole of the data area b21 as viewed in the axial direction of the disc, that is, the direction perpendicular to the major surfaces of the disc or the direction of the propagation of the laser beam. Since the data areas a21 and b21 are different in size, the lead-out areas a22 and b22 are different also. Preferably, the recording of information on the data area b21 is carried out after the whole of the data area a21 has been used for storing information. Since the data area a21 covers the data area b21 as previously mentioned, the recording of information on the data area b21 is implemented by the laser beam passing through the data area a21 even in the presence of a track eccentricity. In this case, since the whole of the data area a21 already stores information, it is possible to provide desired conditions of the recording of information on the data area b21 even in the presence of a track eccentricity. Thus, the recorded information in the data area b21 can be good in quality.

Fourth Embodiment

Figure 9:
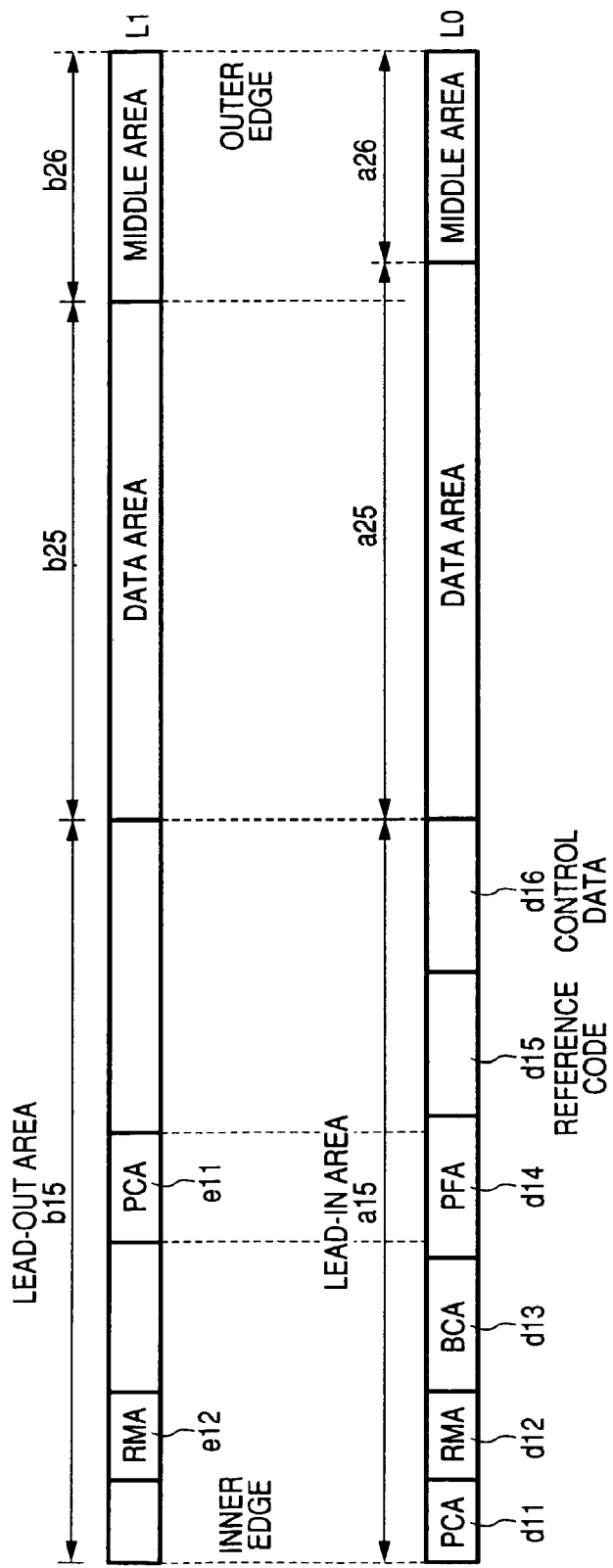
FIG. 9 is a sectional diagram of an information recording medium according to a fourth embodiment of this invention.

FIG. 9 shows an information recording medium or an optical disc according to a fourth embodiment of this invention. The optical disc of FIG. 9 includes a laminate of a first recording layer L0, a transparent layer, and a second recording layer L1 successively arranged in that order. The first recording layer L0 is a semitransparent reflective film. The second recording layer L1 is a reflective film. The transparent layer extends between the first recording layer L0 and the second recording layer L1. The transparent layer has a thickness of, for example, about 40 μm.

The optical disc in FIG. 9 is of a two-layer single-sided type which has an opposite structure related to the first and second recording layers L0 and L1. The first and second recording layers L0 and L1 extend radially with respect to the disc. The first and second recording layers L0 and L1 can be accessed from one side of the disc.

The optical disc of FIG. 9 has a central opening for accommodating a spindle motor shaft, and has an inner circumferential edge and an outer circumferential edge (also referred to as an inner edge and an outer edge). In the optical disc of FIG. 9, the first recording layer L0 has a lead-in area a15, a data area a25, and a middle area a26 which are successively arranged in that order along the direction from the inner edge to the outer edge of the disc. On the other hand, the second recording layer L1 has a lead-out area b15, a data area b25, and a middle area b26 which are successively arranged in that order along the direction from the inner edge to the outer edge of the disc. The first and second recording layers L0 and L1 are formed with tracks divided into physical sectors assigned different ID numbers (serial address numbers) respectively. In the first recording layer L0, the ID number of a physical sector at a position on the disc increases as the position moves from the inner edge toward the outer edge of the disc. Conversely, in the second recording layer L1, the ID number of a physical sector at a position on the disc decreases as the position moves from the inner edge toward the outer edge of the disc. Furthermore, in each of the first and second recording layers L0 and L1, land pre-pit information (LPP information) is recorded on wobbles of the track as address information. The LPP information represents a value (an address value) indicative of the address of a related point in the recording layer.

The lead-in area a15 and the lead-out area b15 in FIG. 9 are similar to those in FIG. 7. The data area a25 in the first recording layer L0 is greater in size than the data area b25 in the second recording layer L1 by a value corresponding to at least a track eccentricity with respect to the disc center. Thus, the outer circumferential edge of the data area a25 is located outward of the outer circumferential edge of the data area b25. The data area a25 covers the whole of the data area b25 as viewed in the axial direction of the disc, that is, the direction perpendicular to the major surfaces of the disc or the direction of the propagation of the laser beam. Since the data areas a25 and b25 are different in size, the middle areas a26 and b26 are different also. Preferably, the recording of information on the data area b25 is carried out after the whole of the data area a25 has been used for storing information. Since the data area a25 covers the data area b25 as previously mentioned, the recording of information on the data area b25 is implemented by the laser beam passing through the data area a25 even in the presence of a track eccentricity. In this case, since the whole of the data area a25 already stores information, it is possible to provide desired conditions of the recording of information on the data area b25 even in the presence of a track eccentricity. Thus, the recorded information in the data area b25 can be good in quality.

Fifth Embodiment

Figure 10:
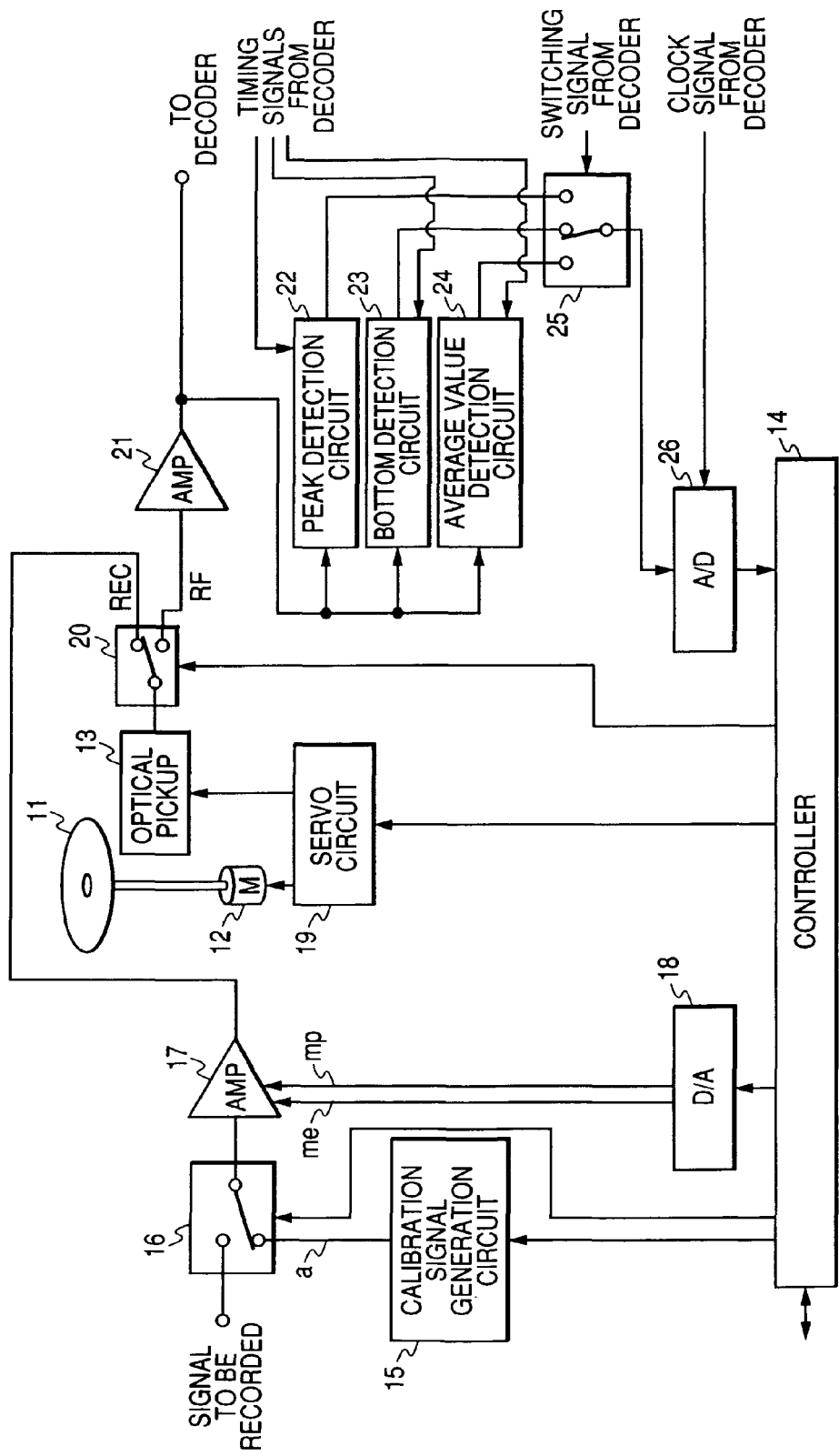
FIG. 10 is a block diagram of a disc drive apparatus according to a fifth embodiment of this invention.

FIG. 10 shows a drive apparatus for an optical disc 11 according to a fifth embodiment of this invention. The optical disc 11 is one of the optical discs in FIGS. 6-9. Thus, the optical disc 11 is of a two-layer single-sided type. The disc drive apparatus in FIG. 10 includes an apparatus for recording and reproducing an information signal on and from the optical disc 11.

The disc drive apparatus in FIG. 10 operates in a mode selected from different ones including a test recording mode, a test reproducing mode, a normal recording mode, and a normal reproducing mode. As shown in FIG. 10, the disc drive apparatus includes a spindle motor 12 and an optical pickup 13. In operation of the disc drive apparatus, the spindle motor 12 rotates the optical disc 11 while the optical pickup 13 applies a laser beam to the optical disc 11. The rotation of the output shaft of the spindle motor 12, that is, the rotation of the optical disc 11, is controlled by a servo circuit 19 so that the optical disc 11 will be scanned by the laser beam at a constant linear velocity (CLV). Accordingly, the rotation of the optical disc 11 is controlled on a CLV basis.

The optical pickup 13 is movable relative to the optical disc 11 in a radial direction with respect to the optical disc 11. The optical pickup 13 includes a laser diode for emitting the laser beam toward the optical disc 11. In operation of the disc drive apparatus, the optical pickup 13 is controlled by the servo circuit 19 so that the laser beam will follow a track on the optical disc 11 during the rotation of the optical disc 11. The operation of the servo circuit 19 is controlled by a controller 14.

During the test recording mode of operation, a calibration signal generation circuit 15 is controlled by the controller 14 to repetitively generate a calibration signal (a test signal) "a". The calibration signal generation circuit 15 outputs the repetitively-generated calibration signal "a" to a switch 16. As will be explained later, the repetitively-generated calibration signal "a" is recorded on the optical disc 11. The calibration signal "a" has a train of pulses. The calibration signal "a" is set to 50% in duty cycle to prevent the adverse effect of the DC signal component.

Figure 11:
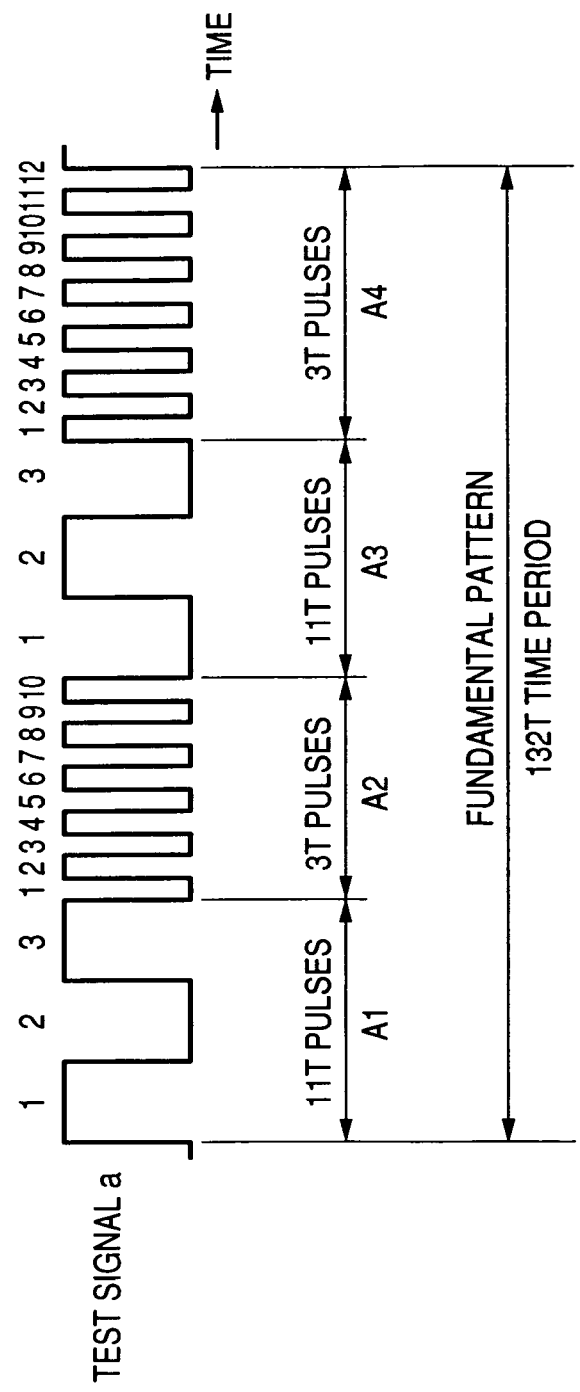
FIG. 11 is a time-domain diagram of the waveform of a calibration signal (a test signal).

Preferably, the calibration signal (the test signal) "a" has a recurrence of a fundamental pattern. As shown in FIG. 11, the fundamental pattern has a time period (a time length) equal to 132T where T denotes a bit period. The fundamental pattern is divided into first, second, third, and fourth intervals A1, A2, A3, and A4 sequentially arranged in that order. The first and third intervals A1 and A3 are equal in time length to 33T. The second interval A2 is equal in time length to 30T. The fourth interval A4 is equal in time length to 36T. The first and third intervals A1 and A3 are occupied by 11T pulses composing 11T signals. The second and fourth intervals A2 and A4 are occupied by 3T pulses composing 3T signals.

Specifically, during the first interval A1, the calibration signal "a" remains at a high level for 11T and then remains at a low level for 11T, and subsequently remains again at the high level for 11T. During the second interval A2, the calibration signal "a" remains at the low level for 3T and then remains at the high level for 3T, and subsequently repeats this level change four more times. During the third interval A3, the calibration signal "a" remains at the low level for 11T and then remains at the high level for 11T, and subsequently remains again at the low level for 11T. During the fourth interval A4, the calibration signal "a" remains at the high level for 3T and then remains at the low level for 3T, and subsequently repeats this level change five more times.

Consequently, in the fundamental pattern, the sum of the time lengths of the 11T high-level pulses is equal to 33T (=11T×3). The sum of the time lengths of the 11T low-level pulses is equal to 33T (=11T×3). The sum of the time lengths of the 3T high-level pulses is equal to 33T (=3T×11). The sum of the time lengths of the 3T low-level pulses is equal to 33T (=3T×11). Thus, in the fundamental pattern, the sum of the time lengths of the 11T and 3T high-level pulses is equal to the sum of the time lengths of the 11T and 3T low-level pulses. Accordingly, the fundamental pattern has a duty cycle of 50% at which the adverse effect of the DC signal component hardly occurs.

The controller 14 includes a microcomputer or a similar programmable signal processing device having a combination of an input/output port, a processing section, a ROM or an EEPROM, and a RAM. The controller 14 operates in accordance with a program stored in the ROM or the EEPROM. The program is designed to enable the controller 14 to execute the previously-indicated operation steps and also later-indicated operation steps.

In the case where the optical disc 11 is of the parallel type of FIG. 6 (or the parallel type of FIG. 8) and an information signal having video contents or audio-visual contents is recorded on the optical disc 11 on a real-time basis, the disc drive apparatus operates sequentially in a preliminary normal reproducing mode M1, a first test recording mode M2, a first test reproducing mode M3, a first normal recording mode M4, a second normal recording mode M5, a second test recording mode M6, a second test reproducing mode M7, a third normal recording mode M8, a fourth normal recording mode M9, a fifth normal recording mode M10, and a sixth normal recording mode M11.

The first test recording mode M2 and the first test reproducing mode M3 correspond to test recording and reproduction using the PCA d1 (see FIG. 6) in the first recording layer L0 of the optical disc 11. The second test recording mode M6 and the second test reproducing mode M7 correspond to test recording and reproduction using the PCA e1 (see FIG. 6) in the second recording layer L1 of the optical disc 11. The first normal recording mode M4 relates to the recording of an information signal on the data area a12 (see FIG. 6) in the first recording layer L0. The third normal recording mode M8 relates to the recording of an information signal on the data area b12 (see FIG. 6) in the second recording layer L1.

During the preliminary normal reproducing mode M1 of operation, the controller 14 commands the servo circuit 19 to move the optical pickup 13 to a position corresponding to the RMA d2 in the first recording layer L0 of the optical disc 11. The controller 14 adjusts the optical pickup 13 via the servo circuit 19 so that the RMA d2 will be scanned by the laser beam and the PCA-use address information will be reproduced therefrom. Furthermore, the controller 14 may adjust the optical pickup 13 via the servo circuit 19 so that the RMA e3 in the second recording layer L1 will also be scanned by the laser beam and the PCA-use address information will also be reproduced therefrom. The controller 14 operates a switch 20, thereby receiving the reproduced PCA-use address information from the optical pickup 13 via a reproducing amplifier 21 and a decoder (not shown). The controller 14 detects the boundary between the used portion and the usable portion of the PCA d1 in the first recording layer L0, and also the boundary between the used portion and the usable portion of the PCA e1 in the second recording layer L1 from the reproduced PCA-use address information. On the basis of the detected boundary in the PCA d1, the controller 14 decides a position within the PCA d1 from which the recording of test signals should be started during forthcoming test recording and reproduction. The decided position is referred to as the test-recording start position within the PCA d1. On the basis of the detected boundary in the PCA e1, the controller 14 decides a position within the PCA e1 from which the recording of test signals should be started during future test recording and reproduction. The decided position is referred to as the test-recording start position within the PCA e1.

The first test recording mode M2 of operation follows the preliminary normal reproducing mode M1 of operation. As denoted by the arrow I in FIG. 12, the first test recording mode M2 of operation implements the recording of the calibration signals (the test signals) "a" on the PCA d1 in the first recording layer L0 of the optical disc 11. During the first test recording mode M2 of operation, the calibration signal generation circuit 15 is controlled by the controller 14 to repetitively generate the calibration signal "a". The calibration signal generation circuit 15 outputs the repetitively-generated calibration signal "a" to the switch 16. The switch 16 is controlled by the controller 14 to pass the calibration signal "a" to the recording amplifier 17. The recording amplifier 17 enlarges the calibration signal "a", and outputs the enlarged calibration signal "a" to the switch 20. The switch 20 is controlled by the controller 14 to pass the calibration signal "a" to the laser diode in the optical pickup 13. The laser diode is driven in response to the calibration signal "a" so that the laser beam emitted by the laser diode will be modulated in accordance with the calibration signal "a". The power of the laser beam depends on the amplitude of the calibration signal "a".

The ROM or the EEPROM in the controller 14 stores power control data. The controller 14 transfers the power control data from the ROM or the EEPROM to a D/A converter 18. The D/A converter 18 changes the power control data into a recording laser power control signal "mp" and an erasing laser power control signal "me". The D/A converter 18 outputs the recording laser power control signal "mp" and the erasing laser power control signal "me" to the recording amplifier 17. The gain of the recording amplifier 17 is varied in response to the recording laser power control signal "mp" and the erasing laser power control signal "me". Thus, the amplitude of the enlarged calibration signal "a" is changed in response to the recording laser power control signal "mp" and the erasing laser power control signal "me". The recording power of the laser beam is decided by the recording laser power control signal "mp". The erasing power of the laser beam is decided by the erasing laser power control signal "me".

During the first test recording mode M2 of operation, the controller 14 notifies the servo circuit 19 of the test-recording start position within the PCA d1 in the first recording layer L0, and the radial position of the optical pickup 13 relative to the optical disc 11 is controlled by the servo circuit 19 in response to a command from the controller 14 so that the laser beam emitted from the optical pickup 13 will scan a portion of the PCA d1 from the test-recording start position and record the repetitively-generated calibration signal "a" thereon. At the same time, the controller 14 accesses the recording amplifier 17 via the D/A converter 18 and changes the gain of the recording amplifier 17 among twenty-six different values to implement the following procedure. The test signal "a" whose quantity is equal to a predetermined value such as one sync frame is recorded on the PCA d1 twenty-six times while the recording power of the laser beam is sequentially changed among twenty-six predetermined different levels. Accordingly, there is a sequence of twenty-six stages each assigned to the once recording of a 1-sync-frame-corresponding test signal "a" and one recording power level of the laser beam. As a result, the PCA d1 is loaded with the twenty-six calibration signals "a" which correspond to the twenty-six predetermined different recording power levels of the laser beam respectively.

The first test reproducing mode M3 of operation follows the first test recording mode M2 of operation. During the first test reproducing mode M3 of operation, the laser diode in the optical pickup 13 emits the laser beam at a constant reproducing power level. The radial position of the optical pickup 13 relative to the optical disc 11 is controlled by the servo circuit 19 in response to a command from the controller 14 so that the laser beam emitted from the optical pickup 13 will scan the portion of the PCA d1 in the first recording layer L0 on which the twenty-six calibration signals "a" have been recorded, and that the optical pickup 13 will receive the laser beam returned from the portion of the PCA d1. The returned laser beam contains the calibration signals "a", a wobble signal, and an address signal (an LPP address signal) reproduced from the optical disc 11. The optical pickup 13 converts the received laser beam into an RF signal containing the reproduced calibration signals "a", the reproduced wobble signal, and the reproduced address signal. The optical pickup 13 outputs the RF signal to the switch 20.

During the first test reproducing mode M3 of operation, the switch 20 is controlled by the controller 14 to pass the RF signal to the reproducing amplifier 21. The reproducing amplifier 21 enlarges the RF signal, and outputs the enlarged RF signal to the decoder (not shown), a peak detection circuit 22, a bottom detection circuit 23, and an average value detection circuit 24.

The decoder recovers the wobble signal and the address signal from the RF signal. The decoder generates timing signals for the peak detection circuit 22, the bottom detection circuit 23, and the average value detection circuit 24 in response to the recovered wobble signal and the recovered address signal. The decoder outputs the generated timing signals to the peak detection circuit 22, the bottom detection circuit 23, and the average value detection circuit 24 respectively. Furthermore, the decoder generates a switching signal in response to the recovered wobble signal and the recovered address signal. The decoder outputs the generated switching signal to a switch 25. In addition, the decoder generates a clock signal from the recovered wobble signal. The decoder outputs the generated clock signal to an A/D converter 26.

Each of the peak detection circuit 22, the bottom detection circuit 23, the average value detection circuit 24 includes a sample-and-hold circuit. The peak detection circuit 22 periodically samples and holds a peak level of the RF signal in response to the related timing signal outputted from the decoder. The peak detection circuit 22 outputs the peak level signal to the switch 25. The bottom detection circuit 23 periodically samples and holds a bottom level of the RF signal in response to the related timing signal outputted from the decoder. The bottom detection circuit 23 outputs the bottom level signal to the switch 25. The average value detection circuit 24 periodically samples and holds an average level of the RF signal in response to the related timing signal outputted from the decoder. The average value detection circuit 24 outputs the average level signal to the switch 25.

The switch 25 sequentially and cyclically selects one among the peak level signal, the bottom level signal, and the average level signal in a prescribed order in response to the switching signal outputted from the decoder, thereby multiplexing the peak level signal, the bottom level signal, and the average level signal on a time sharing basis. The switch 25 outputs the resultant multiplexed signal to the A/D converter 26. The A/D converter 26 changes the multiplexed signal into a corresponding digital signal in response to the clock signal outputted from the decoder. The A/D converter 26 outputs the digital signal to the controller 14. The controller 14 uses the output signal of the A/D converter 26 for deciding an optimum recording power value of the laser beam for the first recording layer L0 in the optical disc 11.

Each of the twenty-six calibration signals (the twenty-six test signals) "a" includes an 11T signal and a 3T signal. Accordingly, during the first test reproducing mode M3 of operation, the RF signal outputted from the reproducing amplifier 21 also includes an 11T signal and a 3T signal for each of the twenty-six calibration signals "a". The peak level signal generated by the peak detection circuit 22 corresponds to the peak level provided by the 11T signal in the RF signal. The bottom level signal generated by the bottom detection circuit 23 corresponds to the bottom level provided by the 11T signal in the RF signal. The average value detection circuit 24 includes an averaging circuit having a low pass filter for averaging (or smoothing) the 3T signal in the RF signal. The average level signal generated by the average value detection circuit 24 corresponds to the result of the averaging of the 3T signal. The averaging circuit in the average value detection circuit 24 can be tuned to average one of a 3T signal, a 4T signal, and a 5T signal in accordance with the setting of the frequency response of the low pass filter therein.

The twenty-six calibration signals "a" correspond to the twenty-six predetermined different recording power levels of the laser beam, respectively. Thus, during the first test reproducing mode M3 of operation, the controller 14 is informed of the detected peak level provided by the 11T signal, the detected bottom level provided by the 11T signal, and the detected average level of the 3T signal for each of the twenty-six predetermined different recording power levels. The controller 14 calculates the middle value between the detected peak level provided by the 11T signal and the detected bottom level provided by the 11T signal for each of the twenty-six predetermined different recording power levels. The controller 14 compares the calculated middle value with the detected average level of the 3T signal to compute an asymmetry value $\beta$ for each of the twenty-six predetermined different recording power levels. Specifically, the controller 14 computes the difference between the calculated middle value and the detected average level, and also the peak-to-peak value between the detected peak level and the detected bottom level. Then, the controller 14 divides the computed difference by the computed peak-to-peak value to get the asymmetry value $\beta$. The controller 14 gets the computed asymmetry values $\beta$ for the twenty-six predetermined different recording power levels respectively. The controller 14 selects one from the computed asymmetry values $\beta$ which is the closest to a predetermined target asymmetry value $\beta$. The controller 14 detects one among the twenty-six predetermined different recording power levels which corresponds to the selected asymmetry value $\beta$. The controller 14 designates the detected recording power level as an optimum laser-beam recording power value for the first recording layer L0 in the optical disc 11.

The controller 14 may decide the optimum laser-beam recording power value for the first recording layer L0 in the following way. An optimum laser-beam recording power which corresponds to the predetermined target asymmetry value β is estimated from at least two among the twenty-six predetermined different recoding power levels through interpolation responsive to at least two among the computed asymmetry values β.

The ROM or the EEPROM in the controller 14 stores data representing the predetermined target asymmetry value β. For example, the predetermined target asymmetry value β is equal or close to 0%. Generally, the predetermined target asymmetry value β is chosen to depend on the type of an optical disc, the operation characteristics of an optical pickup, and the recording conditions such as the recording waveform (the recording strategy) of a laser beam. Experiments using optical discs of different types are previously performed, and target asymmetry values β are predetermined on the basis of the results of the experiments for the respective optical disc types. Data representing one of the predetermined target asymmetry values β which corresponds to the optical disc 11 is written into the ROM or the EEPROM in the controller 14 during the manufacture of the disc drive apparatus.

In general, a DVD-RW which can be used as the optical disc 11 stores an ID information piece intrinsic to the disc, an information piece representing a recording laser power level recommended by the maker of the disc, an information piece representing a ratios between the recommended recording laser power level and an erasing laser power level, an information piece representing a head-pulse width in the recording waveform of a laser beam, an information piece representing an intermediate-multiple-pulse width in the recording waveform, and an information piece representing a cooling-pulse width or a rear-end-pulse width in the recording waveform. The head-pulse width, the intermediate-multiple-pulse width, and the cooling-pulse width or the rear-end-pulse width define the recording strategy of the laser beam. In the presence of an asymmetry value β, the DVD-RW stores an information piece representing a recommended asymmetry value β together with an information piece representing a linear velocity or linear velocities. Specifically, the DVD-RW stores an information piece representing recommended asymmetry values β for respective different integral multiples of the standard linear velocity.

During the manufacture of the disc drive apparatus, the optical disc 11 is evaluated. In the case where the result of the evaluation shows that the recommended asymmetry value or values β represented by an information piece recorded on the optical disc 11 are acceptable to the disc drive apparatus, the information piece representing the recommended asymmetry value or values β is written into the ROM or the EEPROM in the controller 14 as an information piece representing predetermined target one or ones. Furthermore, an ID information piece intrinsic to the optical disc 11 is written into the ROM or the EEPROM in the controller 14. In the case where the result of the evaluation shows that the recommended asymmetry value or values β represented by the information piece recorded on the optical disc 11 are acceptable to the disc drive apparatus after they are slightly changed by offsets, the information piece representing the recommended asymmetry value or values β and also an information piece representing the offsets are written into the ROM or the EEPROM in the controller 14 as an information piece representing predetermined target one or ones. Furthermore, the ID information piece intrinsic to the optical disc 11 is written into the ROM or the EEPROM in the controller 14. In the absence of an information piece from the optical disc 11 which represents a recommended asymmetry value or values β, a target asymmetry value β corresponding to an optimum recording laser power level is predetermined by measurement using the optical disc 11. In this case, an information piece representing the predetermined target asymmetry value β is written into the ROM or the EEPROM in the controller 14. Furthermore, the ID information piece intrinsic to the optical disc 11 is written into the ROM or the EEPROM in the controller 14.

On the other hand, in the case where the result of the evaluation shows that the recommended asymmetry value or values β represented by the information piece recorded on the optical disc 11 are unacceptable to the disc drive apparatus, the information piece representing the recommended asymmetry value or values β is merely written into the ROM or the EEPROM in the controller 14 as an information piece unrelated to predetermined target one or ones. Furthermore, the ID information piece intrinsic to the optical disc 11 is written into the ROM or the EEPROM in the controller 14.

The first normal recording mode M4 of operation follows the first test reproducing mode M3 of operation. As denoted by the arrow II in FIG. 12, the first normal recording mode M4 of operation implements the recording of an information signal on the data area a12 in the first recording layer L0 of the optical disc 11. During the first normal recording mode M4 of operation, an information signal to be recorded is fed to the switch 16. The information signal has video contents or audio visual contents, and results from subjecting an original signal to compression and buffering at a preceding stage (not shown in FIG. 10). The switch 16 is controlled by the controller 14 to pass the information signal to the recording amplifier 17. The recording amplifier 17 enlarges the information signal at a gain corresponding to the optimum recording power of the laser beam for the first recording layer L0 which has been decided by the last test recording and reproduction, and which is notified from the controller 14 via the D/A converter 18. The recording amplifier 17 outputs the enlarged information signal to the switch 20. The switch 20 is controlled by the controller 14 to pass the information signal to the laser diode in the optical pickup 13. The laser diode is driven in response to the information signal so that the laser beam emitted by the laser diode will be modulated in accordance with the information signal. The power of the laser beam depends on the amplitude of the information signal. The radial position of the optical pickup 13 relative to the optical disc 11 is controlled by the servo circuit 19 in response to a command from the controller 14 so that the laser beam emitted from the optical pickup 13 will scan the data area a12 in the first recording layer L0 of the optical disc 11 and record the information signal thereon. At this time, the recording power of the laser beam is maintained at the optimum value for the first recording layer L0 which has been decided by the last test recording and reproduction. The recording of the information signal on the data area a12 may be in an intermittent fashion.

The second normal recording mode M5 of operation follows the first normal recording mode M4 of operation. As denoted by the arrow III in FIG. 12, the second normal recording mode M5 of operation implements the recording of control data on the physical format area d4 in the first recording layer L0 of the optical disc 11. During the second normal recording mode M5 of operation, control data is fed to the switch 16. The switch 16 is controlled by the controller 14 to pass the control data to the recording amplifier 17. The recording amplifier 17 enlarges the control data at a gain corresponding to the optimum recording power of the laser beam for the first recording layer L0 which has been decided by the last test recording and reproduction, and which is notified from the controller 14 via the D/A converter 18. The recording amplifier 17 outputs the enlarged control data to the switch 20. The switch 20 is controlled by the controller 14 to pass the control data to the laser diode in the optical pickup 13. The laser diode is driven in response to the control data so that the laser beam emitted by the laser diode will be modulated in accordance with the control data. The power of the laser beam depends on the amplitude of the control data. The radial position of the optical pickup 13 relative to the optical disc 11 is controlled by the servo circuit 19 in response to a command from the controller 14 so that the laser beam emitted from the optical pickup 13 will scan the physical format area d4 in the first recording layer L0 and record the control data thereon. At this time, the recording power of the laser beam is maintained at the optimum value for the first recording layer L0 which has been decided by the last test recording and reproduction.

The second test recording mode M6 of operation follows the second normal recording mode M5 of operation. As denoted by the arrow IV in FIG. 12, the second test recording mode M6 operation implements the recording of the calibration signals (the test signals) "a" on the PCA e1 in the second recording layer L1 of the optical disc 11. During the second test recording mode M6 of operation, the servo circuit 19 moves or jumps an objective lens within the optical pickup 13 toward the optical disc 11 (in the focusing direction) by a prescribed distance in response to a command from the controller 14 so that the laser beam will be focused on the second recording layer L1 instead of the first recording layer L0. The calibration signal generation circuit 15, the switch 16, the recording amplifier 17, the D/A converter 18, and the switch 20 are controlled by the controller 14 as they are controlled during the first test recording mode M2 of operation.

During the second test recording mode M6 of operation, the controller 14 notifies the servo circuit 19 of the test-recording start position within the PCA e1 in the second recording layer L1, and the radial position of the optical pickup 13 relative to the optical disc 11 is controlled by the servo circuit 19 in response to a command from the controller 14 so that the laser beam emitted from the optical pickup 13 will scan a portion of the PCA e1 from the test-recording start position and record the repetitively-generated calibration signal "a" thereon. As a result, the PCA e1 is loaded with the twenty-six calibration signals "a" which correspond to the twenty-six predetermined different recording power levels of the laser beam respectively.

The second test reproducing mode M7 of operation follows the second test recording mode M6 of operation. The second test reproducing mode M7 of operation reproduces the twenty-six calibration signals "a" from the PCA e1 in the second recording layer L1 as the first test reproducing mode of operation does. The second test reproducing mode M7 of operation decides an optimum recording power value of the laser beam for the second recording layer L1 in response to the reproduced twenty-six calibration signals "a" as the first test reproducing mode M3 of operation does. Specifically, the twenty-six calibration signals "a" correspond to the twenty-six predetermined different recording power levels of the laser beam, respectively. The controller 14 gets the computed asymmetry values $\beta$ for the twenty-six predetermined different recording power levels respectively. The controller 14 selects one from the computed asymmetry values $\beta$ which is the closest to a predetermined target asymmetry value $\beta$. The controller 14 detects one among the twenty-six predetermined different recording power levels which corresponds to the selected asymmetry value $\beta$. The controller 14 designates the detected recording power level as an optimum laser-beam recording power value for the second recording layer L1 in the optical disc 11. The controller 14 may decide the optimum laser-beam recording power value for the second recording layer L1 in the following way. An optimum laser-beam recording power which corresponds to the predetermined target asymmetry value $\beta$ is estimated from at least two among the twenty-six predetermined different recoding power levels through interpolation responsive to at least two among the computed asymmetry values $\beta$.

The third normal recording mode M8 of operation follows the second test reproducing mode M7 of operation. As denoted by the arrow V in FIG. 12, the third normal recording mode M8 of operation implements the recording of an information signal on the data area b12 in the second recording layer L1 of the optical disc 11. During the third normal recording mode M8 of operation, an information signal to be recorded is fed to the switch 16. The switch 16 is controlled by the controller 14 to pass the information signal to the recording amplifier 17. The recording amplifier 17 enlarges the information signal at a gain corresponding to the optimum recording power of the laser beam for the second recording layer L1 which has been decided by the last test recording and reproduction, and which is notified from the controller 14 via the D/A converter 18. The recording amplifier 17 outputs the enlarged information signal to the switch 20. The switch 20 is controlled by the controller 14 to pass the information signal to the laser diode in the optical pickup 13. The laser diode is driven in response to the information signal so that the laser beam emitted by the laser diode will be modulated in accordance with the information signal. The power of the laser beam depends on the amplitude of the information signal. The radial position of the optical pickup 13 relative to the optical disc 11 is controlled by the servo circuit 19 in response to a command from the controller 14 so that the laser beam emitted from the optical pickup 13 will scan the data area b12 in the second recording layer L1 and record the information signal thereon. At this time, the recording power of the laser beam is maintained at the optimum value for the second recording layer L1 which has been decided by the last test recording and reproduction. The recording of the information signal on the data area b12 may be in an intermittent fashion.

As previously mentioned, the PCA e1 in the second recording layer L1 is opposed to the physical format area d4 in the first recording layer L0. In more detail, the physical format area d4 overlaps and covers the PCA e1 as viewed in the axial direction of the disc (that is, the direction perpendicular to the major surfaces of the disc or the direction of the propagation of the laser beam). The physical format area d4 also covers the circumferential zones adjoining the inner and outer edges (sides) of the PCA e1 and each having a size corresponding to greater than a track eccentricity with respect to the disc center. Before the recording of the calibration signals "a" on the PCA e1, the control data is recorded on the physical format area d4 so that the physical format area d4 falls into uniform record conditions. Thus, during the recording of the calibration signals "a" on the PCA e1, the laser beam remains correctly focused on the PCA e1 even in the presence of a track eccentricity since the laser beam always passes through the uniformly-conditioned physical format area d4 before reaching the PCA e1. Therefore, the recording of the calibration signals "a" on the PCA e1 continues to be in constant conditions so that the quality of the recorded calibration signals "a" is relatively high.

As previously mentioned, the data area a12 in the first recording layer L0 and the data area b12 in the second recording layer L1 are substantially opposed to or aligned with each other as viewed in the axial direction of the disc. The recording of the information signal on the data area b12 is performed after the recording of the information signal on the data area a12. During the recording of the information signal on the data area b12, the laser beam passes through the information-signal-loaded data area a12 before reaching the data area b12.

During the recording of the calibration signals "a" on the PCA e1, the laser beam passes through the control-data-loaded physical format area d4 before reaching the PCA e1. Thus, the laser beam passes through the similar signal-loaded portions of the first recording layer L0 during the recording of the information signal on the data area b12 and also during the recording of the calibration signals "a" on the PCA e1. Accordingly, the optimum laser-beam recording power for the second recording layer L1 which is decided by use of the PCA e1 can be accurate.

The recording of the information signal on the data area a12 places the data area a12 in uniform record conditions. Thus, during the recording of the information signal on the data area b12, the laser beam remains correctly focused on the data area b12 since the laser beam always passes through the uniformly-conditioned data area a12 before reaching the data area b12. Therefore, the recording of the information signal on the data area b12 continues to be in constant conditions so that the quality of the recorded information signal is relatively high.

The fourth normal recording mode M9 of operation follows the third normal recording mode M8 of operation. As denoted by the arrow VI in FIG. 12, the fourth normal recording mode M9 of operation implements the recording of a prescribed signal on the lead-out area a13 in the first recording layer L0 of the optical disc 11. During the fourth normal recording mode M9 of operation, a prescribed signal is fed to the switch 16. The switch 16 is controlled by the controller 14 to pass the prescribed signal to the recording amplifier 17. The recording amplifier 17 enlarges the prescribed signal at a gain corresponding to the optimum recording power of the laser beam for the first recording layer L0 which is notified from the controller 14 via the D/A converter 18. The recording amplifier 17 outputs the enlarged prescribed signal to the switch 20. The switch 20 is controlled by the controller 14 to pass the prescribed signal to the laser diode in the optical pickup 13. The laser diode is driven in response to the prescribed signal so that the laser beam emitted by the laser diode will be modulated in accordance with the prescribed signal. The radial position of the optical pickup 13 relative to the optical disc 11 is controlled by the servo circuit 19 in response to a command from the controller 14 so that the laser beam emitted from the optical pickup 13 will scan the lead-out area a13 in the first recording layer L0 and record the prescribed signal thereon. The prescribed signal is, for example, an all-zero signal.

The fifth normal recording mode M10 of operation follows the fourth normal recording mode M9 of operation. As denoted by the arrow VII in FIG. 12, the fifth normal recording mode M10 of operation implements the recording of the prescribed signal on the lead-out area b13 in the second recording layer L1 of the optical disc 11. During the fifth normal recording mode M10 of operation, the servo circuit 19 moves or jumps the objective lens within the optical pickup 13 toward the optical disc 11 (in the focusing direction) by the prescribed distance in response to a command from the controller 14 so that the laser beam will be focused on the second recording layer L1 instead of the first recording layer L0. The prescribed signal is fed to the switch 16. The switch 16, the recording amplifier 17, the D/A converter 18, and the switch 20 are controlled by the controller 14 as they are controlled during the fourth normal recording mode M9 of operation. Thus, the prescribed signal is sent to the laser diode in the optical pickup 13. The laser diode is driven in response to the prescribed signal so that the laser beam emitted by the laser diode will be modulated in accordance with the prescribed signal. The radial position of the optical pickup 13 relative to the optical disc 11 is controlled by the servo circuit 19 in response to a command from the controller 14 so that the laser beam emitted from the optical pickup 13 will scan the lead-out area b13 in the second recording layer L1 of the optical disc 11 and record the prescribed signal thereon.

The sixth normal recording mode M11 of operation follows the fifth normal recording mode M10 of operation. During the sixth normal recording mode M11 of operation, the controller 14 generates recording management information having at least one of pieces (1)-(9) as follows. The information piece (1) represents the optimum laser-beam recording power value for the first recording layer L0 which has been decided last. The information piece (2) represents the optimum laser-beam recording power value for the second recording layer L1 which has been decided last. The information piece (3) represents the addresses of the portion of the PCA d1 on which the calibration signals "a" have been recorded last. The information piece (4) represents the addresses of the portion of the PCA e1 on which the calibration signals "a" have been recorded last. The information piece (5) represents the results of the evaluation of the reproduced test signals "a" (for example, the asymmetry values $\beta$, the jitter values, the error rates, or the modulation degrees of the reproduced test signals "a"). The information piece (6) represents at least one optimum erasing power of the laser beam. The information piece (7) represents recording conditions including the type of the recording strategy (the recording laser beam waveform) and at least one optimum parameter for the recording strategy. The information piece (8) represents environmental conditions including a disc temperature, a disc vibration, and a disc surface vibration. The information piece (9) represents items of a recording apparatus (a disc drive apparatus) such as the name of the manufacturer of the recording apparatus, the ID number of the recording apparatus, the lot number of the recording apparatus, and the serial number of the recording apparatus.

During the sixth normal recording mode M11 of operation, the controller 14 outputs the generated recording management information to an encoder not shown in the drawings. The controller 14 operates the encoder and the switches 16 and 20 so that the recording management information will be sent from the encoder to the optical pickup 13 through the recording amplifier 17. The controller 14 commands the servo circuit 19 to move the optical pickup 13 to a position corresponding to the RMA d2 in the first recording layer L0 of the optical disc 11. The controller 14 adjusts the optical pickup 13 via the servo circuit 19 so that the RMA d2 will be scanned by the laser beam and the recording management information will be recorded thereon. In the event that the recording management information overflows the RMA d2, the controller 14 adjusts the optical pickup 13 via the servo circuit 19 to record the overflow portion of the recording management information on the RMA e3 in the second recording layer L1 of the optical disc 11.

In the case where the optical disc 11 is of the opposite type of FIG. 7 (or the opposite type of FIG. 9) and an information signal having video contents or audio-visual contents is recorded on the optical disc 11 on a real-time basis, the disc drive apparatus operates sequentially in different modes. Basically, the operation of the disc drive apparatus is similar to that occurring when the optical disc 11 is of the parallel type in FIG. 6 except for the following points.

In the disc drive apparatus, the laser beam emitted from the optical pickup 13 is focused on the first recording layer L0 of the optical disc 11. Then, as denoted by the arrow I in FIG. 13, the laser beam scans the PCA d11 in the first recording layer L0 in the direction from the inner edge toward the outer edge of the optical disc 11 while successively recording the calibration signals (the test signals) "a" thereon. Subsequently, the recorded calibration signals "a" are reproduced from the PCA d11. An optimum laser-beam recording power value for the first recording layer L0 is decided in response to the reproduced calibration signals "a".

Figure 13:
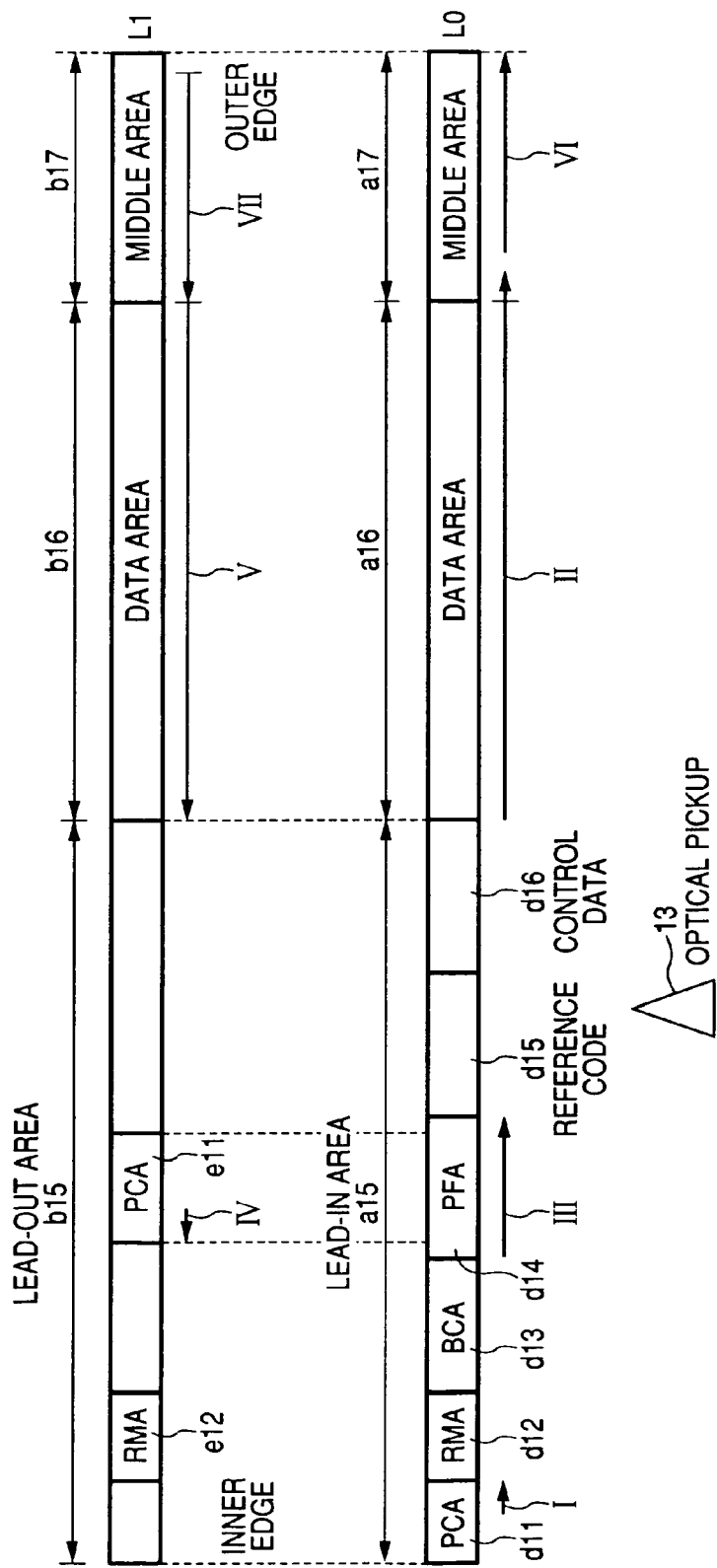
FIG. 13 is a sectional diagram of a second optical disc driven by the disc drive apparatus in FIG. 11.

Then, as denoted by the arrow II in FIG. 13, the laser beam scans the data area a16 in the first recording layer L0 in the direction from the inner edge toward the outer edge of the optical disc 11 while recording an information signal thereon. The information signal has video contents or audio visual contents, and results from subjecting an original signal to compression and buffering. During the recording of the information signal on the data area a16, the recording laser power is maintained at the optimum value for the first recording layer L0 which has been decided last. The recording of the information signal on the data area a16 may be in an intermittent fashion. After the recording of the information signal on the data area a16 is completed, the laser beam scans the physical format area d14 in the first recording layer L0 in the direction from the inner edge toward the outer edge of the optical disc 11 while recording the control data thereon as denoted by the arrow III in FIG. 13. During the recording of the control data on the physical format area d14, the recording laser power is maintained at the optimum value for the first recording layer L0 which has been decided last.

Then, the objective lens is jumped in the focusing direction to focus the laser beam on the second recording layer L1 in the optical disc 11. Subsequently, as denoted by the arrow IV in FIG. 13, the laser beam scans the PCA e11 in the second recording layer L1 in the direction from the outer edge toward the inner edge of the optical disc 11 while successively recording the calibration signals "a" thereon. Thereafter, the recorded calibration signals "a" are reproduced from the PCA e11. An optimum laser-beam recording power value for the second recording layer L1 is decided in response to the reproduced calibration signals "a".

Then, as denoted by the arrow V in FIG. 13, the laser beam scans the data area b16 in the second recording layer L1 in the direction from the outer edge toward the inner edge of the optical disc 11 while recording the information signal thereon. During the recording of the information signal on the data area b16, the recording laser power is maintained at the optimum value for the second recording layer L1 which has been decided last. The recording of the information signal on the data area b16 may be in an intermittent fashion.

After the recording of the information signal on the data area b16 is completed, the objective lens is jumped in the focusing direction to focus the laser beam on the first recording layer L0. Subsequently, as denoted by the arrow VI in FIG. 13, the laser beam scans the middle area a17 in the first recording layer L0 in the direction from the inner edge toward the outer edge of the optical disc 11 while recording a prescribed signal thereon. Then, the objective lens is jumped in the focusing direction to focus the laser beam on the second recording layer L1. Thereafter, as denoted by the arrow VII in FIG. 13, the laser beam scans the middle area b17 in the second recording layer L1 in the direction from the outer edge toward the inner edge of the optical disc 11 while recording the prescribed signal thereon. The prescribed signal is, for example, an all-zero signal.

As previously mentioned, the PCA e11 in the second recording layer L1 is opposed to the physical format area d14 in the first recording layer L0. In more detail, the physical format area d14 overlaps and covers the PCA e11 as viewed in the axial direction of the disc (that is, the direction perpendicular to the major surfaces of the disc or the direction of the propagation of the laser beam). The physical format area d14 also covers the circumferential zones adjoining the inner and outer edges (sides) of the PCA e11 and each having a size corresponding to greater than a track eccentricity with respect to the disc center. Before the recording of the calibration signals "a" on the PCA e11, the control data is recorded on the physical format area d14 so that the physical format area d14 falls into uniform record conditions. Thus, during the recording of the calibration signals "a" on the PCA e11, the laser beam remains correctly focused on the PCA e11 even in the presence of a track eccentricity since the laser beam always passes through the uniformly-conditioned physical format area d14 before reaching the PCA e11. Therefore, the recording of the calibration signals "a" on the PCA e11 continues to be in constant conditions so that the quality of the recorded calibration signals "a" is relatively high.

As previously mentioned, the data area a16 in the first recording layer L0 and the data area b16 in the second recording layer L1 are substantially opposed to or aligned with each other as viewed in the axial direction of the disc. The recording of the information signal on the data area b16 is performed after the recording of the information signal on the data area a16 During the recording of the information signal on the data area b16, the laser beam passes through the information-signal-loaded data area a16 before reaching the data area b16. During the recording of the calibration signals "a" on the PCA e11, the laser beam passes through the control-data-loaded physical format area d14 before reaching the PCA e11. Thus, the laser beam passes through the similar signal-loaded portions of the first recording layer L0 during the recording of the information signal on the data area b16 and also during the recording of the calibration signals "a" on the PCA e11. Accordingly, the optimum laser-beam recording power for the second recording layer L1 which is decided by use of the PCA e11 can be accurate.

The recording of the information signal on the data area a16 places the data area a16 in uniform record conditions. Thus, during the recording of the information signal on the data area b16, the laser beam remains correctly focused on the data area b16 since the laser beam always passes through the uniformly-conditioned data area a16 before reaching the data area b16. Therefore, the recording of the information signal on the data area b16 continues to be in constant conditions so that the quality of the recorded information signal is relatively high.

Figure 12:
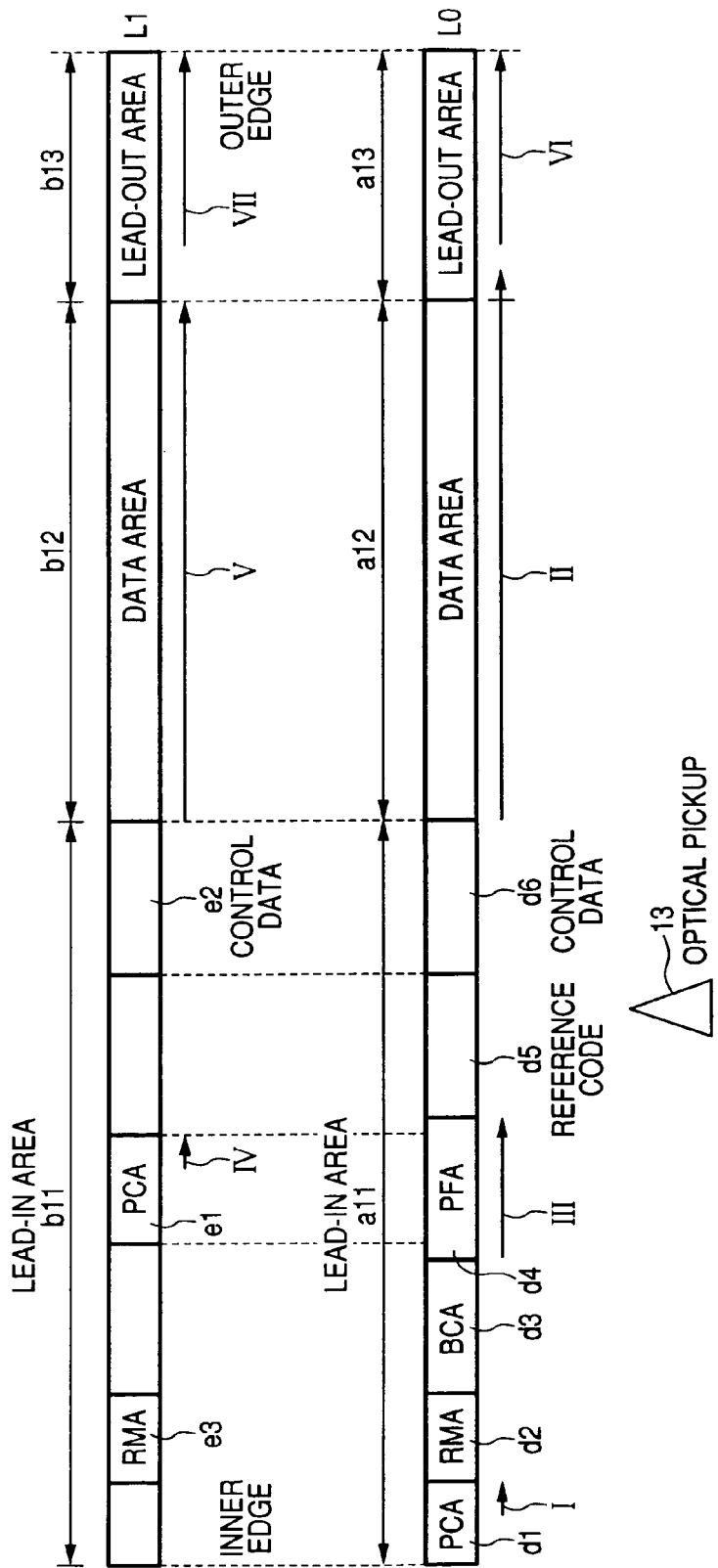
FIG. 12 is a sectional diagram of a first optical disc driven by the disc drive apparatus in FIG. 11.

In FIG. 12, the recording of the control data on the physical format area d4 may precede the recording of the information signal on the data area a12. Similarly, in FIG. 13, the recording of the control data on the physical format area d14 may precede the recording of the information signal on the data area a16. In FIG. 12, the recording of the control data on the physical format area d4 may be performed in time intervals between the intermittent executions of the recording of the information signal on the data area a12. Similarly, in FIG. 13, the recording of the control data on the physical format area d14 may be performed in time intervals between the intermittent executions of the recording of the information signal on the data area a16.

As denoted by the arrow II in FIG. 12, the information signal may be successively recorded on the data area a12 and a portion of the lead-out area a13 which adjoins the data area a12, and which has a size corresponding to at least the track eccentricity. In this case, the track eccentricity can be prevented from adversely affecting the recording of the information signal on the data area b12 by the laser beam with the optimum recording power until the end of the recording.

As denoted by the arrow II in FIG. 13, the information signal may be successively recorded on the data area a16 and a portion of the middle area a17 which adjoins the data area a16, and which has a size corresponding to at least the track eccentricity. In this case, the track eccentricity can be prevented from adversely affecting the recording of the information signal on the data area b16 by the laser beam with the optimum recording power from the start of the recording.

In the case where the optical disc 11 is of the opposite type in FIG. 7, after the information signal is recorded on the data area b16 in the second recording layer L1 in the direction from the outer edge toward the inner edge of the disc, the optical pickup 13 returns to a position corresponding to the outer edge of the data area b16 and then records the prescribed signal on the middle areas a17 and b17. Thus, it is possible to minimize a time loss caused by movement of the objective lens within the optical pickup 13 to provide focus jump between the first and second recording layers L0 and L1. Accordingly, the recording of the prescribed signal on the middle areas a17 and b17 can be prevented from breaking continuity of the contents of the recorded information signal.

In the case where the optical disc 11 is of the opposite type in FIG. 9, after the information signal is recorded on the data area b25 in the second recording layer L1 in the direction from the outer edge toward the inner edge of the disc, the optical pickup 13 returns to a position corresponding to the outer edge of the data area b25 and then records the prescribed signal on the middle areas a26 and b26. Thus, it is possible to minimize a time loss caused by movement of the objective lens within the optical pickup 13 to provide focus jump between the first and second recording layers L0 and L1. Accordingly, the recording of the prescribed signal on the middle areas a26 and b26 can be prevented from breaking continuity of the contents of the recorded information signal.

In FIG. 12, the recording of the information signal on the data area a12 may follow (1) the recording of the control data on the physical format area d4 and (2) the recording and reproduction of the calibration signals "a" on and from the PCA e1. In this case, the recording of the information signal on the data area a12 is immediately succeeded by the recording of the information signal on the data area b12. Thus, the continuously recording of the information signal can be implemented.

In FIG. 13, the recording of the information signal on the data area a16 may follow (1) the recording of the control data on the physical format area d14 and (2) the recording and reproduction of the calibration signals "a" on and from the PCA e11. In this case, the recording of the information signal on the data area a16 is immediately succeeded by the recording of the information signal on the data area b16. Thus, the continuously recording of the information signal can be implemented.

In the case where the optical disc 11 is of the parallel type in FIG. 8, the recording of the information signal on the data area a21 may follow (1) the recording of the control data on the physical format area d4 and (2) the recording and reproduction of the calibration signals "a" on and from the PCA e1. In this case, the recording of the information signal on the data area a21 is immediately succeeded by the recording of the information signal on the data area b21. Thus, the continuously recording of the information signal can be implemented.

In the case where the optical disc 11 is of the opposite type in FIG. 9, the recording of the information signal on the data area a25 may follow (1) the recording of the control data on the physical format area d14 and (2) the recording and reproduction of the calibration signals "a" on and from the PCA e11. In this case, the recording of the information signal on the data area a25 is immediately succeeded by the recording of the information signal on the data area b25. Thus, the continuously recording of the information signal can be implemented.

Sixth Embodiment

A sixth embodiment of this invention relates to a drive apparatus for an optical disc which is similar to that in FIG. 10 except for an additional design indicated hereafter.

Figure 14:
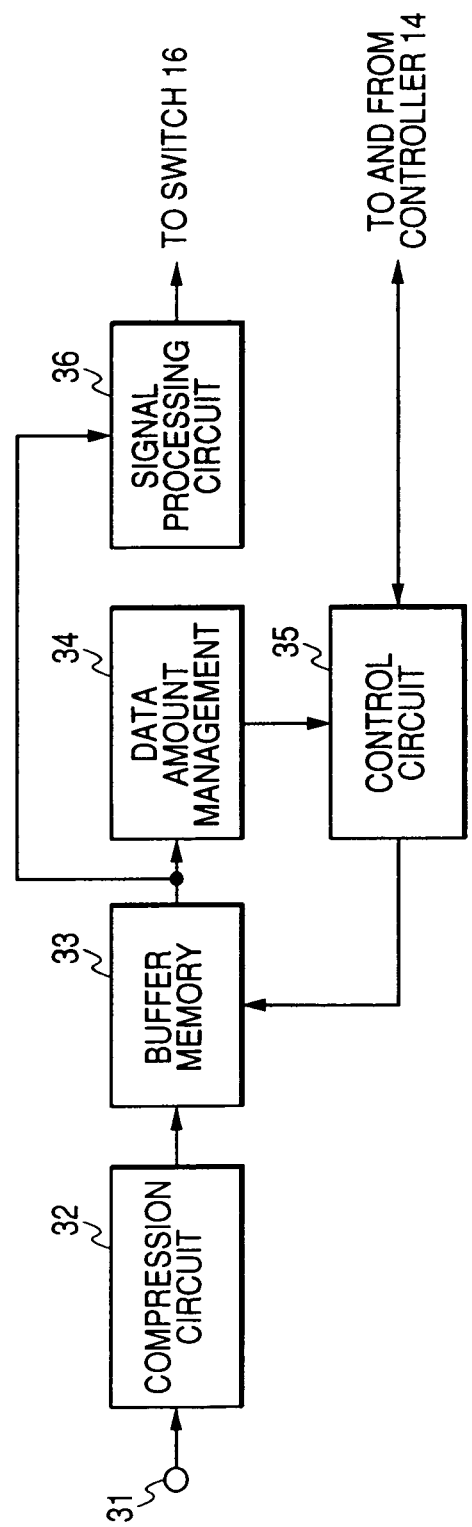
FIG. 14 is a block diagram of an input portion of a disc drive apparatus according to a sixth embodiment of this invention.

FIG. 14 shows an input portion of the disc drive apparatus in the sixth embodiment of this invention. As shown in FIG. 14, the input portion of the disc drive apparatus includes a compression circuit 32, a buffer memory 33, a data amount management device 34, a control circuit 35, and a signal processing circuit 36.

An information signal to be recorded is fed to the compression circuit 32 via an input terminal 31. The compression circuit 32 compressively encodes the information signal into encoded data in a known encoding procedure conforming with, for example, the MPEG2 (Moving Picture Experts Group Phase 2) standards. The compression circuit 32 outputs the encoded data to the buffer memory 33. The buffer memory 33 temporarily stores the encoded data and outputs the encoded data to the signal processing circuit 36 while being controlled by the control circuit 35. The signal processing circuit 36 adds error correction code words, address code words, and sync signals to the encoded data to generate a preprocessed signal to be recorded. The signal processing circuit 36 outputs the preprocessed signal to the switch 16 as an information signal to be recorded.

The data amount management device 34 monitors the amount of the encoded data in the buffer memory 33. The data amount management device 34 determines whether or not the monitored amount reaches a first predetermined value corresponding to a substantially full state of the buffer memory 33. The data amount management device 34 outputs a signal representative of the result of the determination to the control circuit 35. The first predetermined value is slightly smaller than a value (a value of 100%) at which the buffer memory 33 is fully occupied. The first predetermined value is also referred to as the memory-full value. In addition, the data amount management device 34 determines whether or not the monitored amount reaches a second predetermined value smaller than the first predetermined value and corresponding to a substantially empty state of the buffer memory 33. The data amount management device 34 outputs a signal representative of the result of the determination to the control circuit 35. The second predetermined value is slightly greater than a value (a value of 0%) at which the buffer memory 33 is completely empty. The second predetermined value is also referred to as the memory-empty value. Furthermore, the data amount management device 34 determines whether or not the monitored amount reaches a reference value between the memory-full value and the memory-empty value. The data amount management device 34 outputs a signal representative of the result of the determination to the control circuit 35. The reference value is smaller than the memory-full value by a prescribed value. Preferably, the reference value is closer to the memory-full value than the memory-empty value.

The control circuit 35 controls the writing of the encoded data into the buffer memory 33 and the read-out of the encoded data therefrom in response to the output signals from the data amount management device 34. The control circuit 35 can control the compression circuit 32 and the signal processing circuit 36. The control circuit 35 can communicate with the controller 14.

The control circuit 35 includes a microcomputer or a similar programmable signal processing device having a combination of an input/output port, a processing section, a ROM or an EEPROM, and a RAM. The control circuit 35 operates in accordance with a control program stored in the ROM or the EEPROM.

Figure 15:
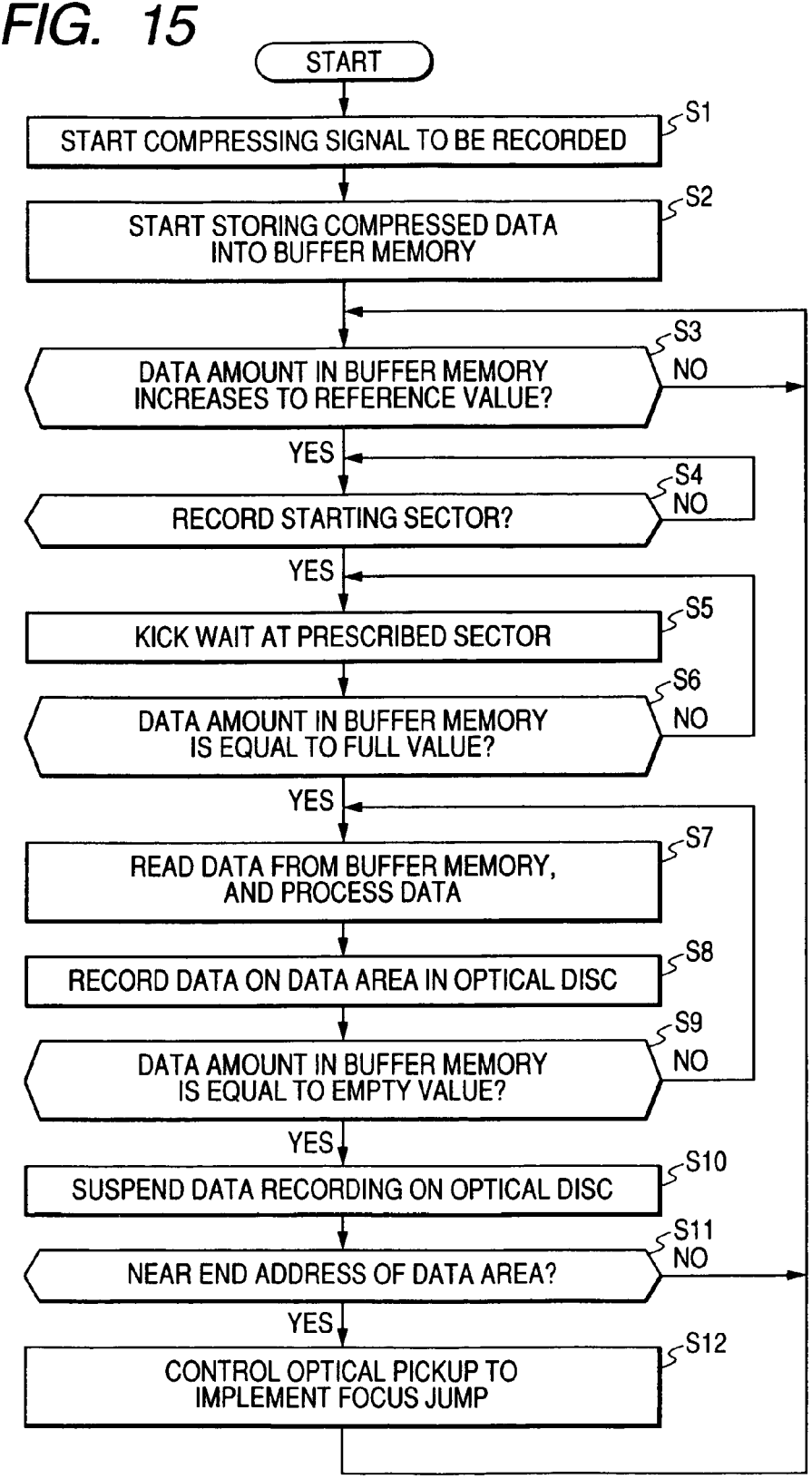
FIG. 15 is a flowchart of a segment of a control program for a control circuit in FIG. 14.

FIG. 15 is a flowchart of a segment of the control program for the control circuit 35 which relates to the recording of an information signal on the data areas in the first and second recording layers L0 and L1 of an optical disc 11 (see FIG. 10).

As shown in FIG. 15, a first step S1 of the program segment starts the compression circuit 32 compressively encoding an information signal to be recorded. The compression circuit 32 gets encoded data as a result of the compressively encoding. The compression circuit 32 outputs the encoded data to the buffer memory 33.

Figure 16:
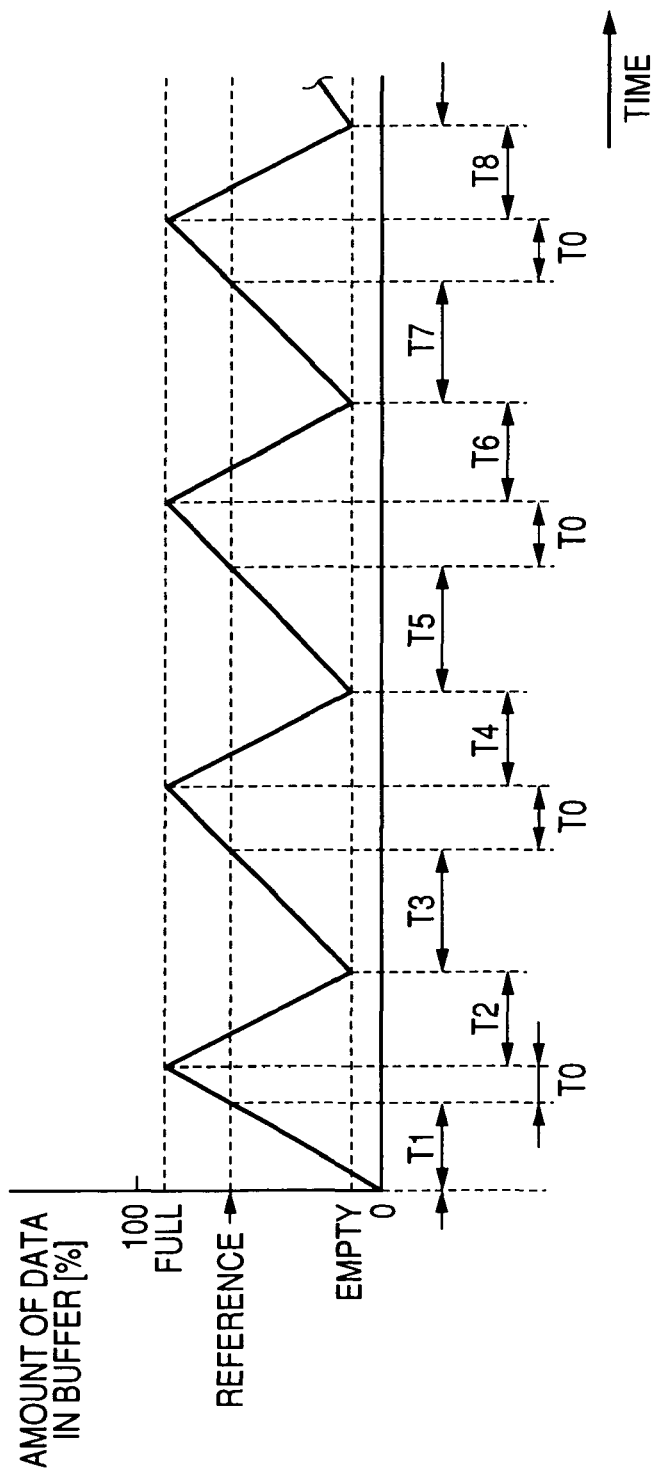
FIG. 16 is a time-domain diagram of the amount of encoded data in a buffer memory in FIG. 14.

A step S2 following the step S1 starts the buffer memory 33 storing the encoded data. Thus, the writing of the encoded data into the buffer memory 33 is commenced. Initially, the amount of the encoded data in the buffer memory 33 is equal to zero. Then, as shown in FIG. 16, the amount of the encoded data in the buffer memory 33 increases toward the memory-full value in accordance with the lapse of time. After the step S2, the program advances to a step S3.

The step S3 checks whether or not an output signal from the data amount management device 34 represents that the amount of the encoded data in the buffer memory 33 has reached the reference value. When the output signal from the data amount management device 34 represents that the amount of the encoded data in the buffer memory 33 has reached the reference value, the program advances from the step S3 to a step S4. Otherwise, the step S3 is repeated. As shown in FIG. 16, when the time T1 has elapsed from the moment of the start of the data writing into the buffer memory 33, the amount of the encoded data in the buffer memory 33 reaches the reference value.

The step S4 controls the servo circuit 19 (see FIG. 10) via the controller 14 to move the optical pickup 13 (see FIG. 10) to a position corresponding to the address of a record starting sector in the data area of the first recording layer L0 in the optical disc 11. The step S4 communicates with the controller 14, and thereby determines whether or not the optical pickup 13 has reached the record-starting-sector address position. When the optical pickup 13 has reached the record-starting-sector address position, the program advances from the step S4 to a step S5. Otherwise, the step S4 is repeated.

The step S5 controls the servo circuit 19 via the controller 14, thereby forcing the optical pickup 13 to implement a kickback of one track turn per revolution of the optical disc 11 and to stay at the record-starting-sector address position. Thus, the step S5 holds the optical pickup 13 in a kick waiting state (a record stand-by state) regarding the record-starting-sector address position. As shown in FIG. 16, the amount of the encoded data in the buffer memory 33 continues to increase while the optical pickup 13 is held in the kick waiting state.

A step S6 following the step S5 checks whether or not an output signal from the data amount management device 34 represents that the amount of the encoded data in the buffer memory 33 has reached the memory-full value. When the output signal from the data amount management device 34 represents that the amount of the encoded data in the buffer memory 33 has reached the memory-full value, the program advances from the step S6 to a step S7. Otherwise, the program returns from the step S6 to the step S5. As shown in FIG. 16, when the time T0 has elapsed from the moment of the increase of the amount of the encoded data in the buffer memory 33 to the reference value, the amount of the encoded data in the buffer memory 33 reaches the memory-full value.

The step S7 controls the buffer memory 33 so that the encoded data will be read out therefrom while the encoded data outputted from the compression circuit 32 will be written thereinto. The rate of the read-out of the encoded data from the buffer memory 33 is higher than the rate of the writing of the encoded data thereinto. Consequently, the amount of the encoded data in the buffer memory 33 starts decreasing as shown in FIG. 16. The encoded data read out from the buffer memory 33 is fed to the signal processing circuit 36. The step S7 controls the signal processing circuit 36 to add error correction code words, address code words, and sync signals to the encoded data to generate a preprocessed signal to be recorded. The signal processing circuit 36 outputs the preprocessed signal to the switch 16 as an information signal to be recorded.

A step S8 following the step S7 commands the controller 14 to implement the normal recording mode of operation. Thus, the information signal is transmitted from the switch 16 to the optical pickup 13 through the recording amplifier 17 and the switch 20 (see FIG. 10). The step S8 controls the servo circuit 19 via the controller 14 to change the optical pickup 13 from the kick waiting state to a recording state and hence to start the optical pickup 13 recording the information signal on the data area in the first recording layer L0 from the record-starting-sector address position. Accordingly, the step S8 implements the recording of the information signal on the data area in the first recording layer L0.

A step S9 subsequent to the step S8 checks whether or not an output signal from the data amount management device 34 represents that the amount of the encoded data in the buffer memory 33 has reached the memory-empty value. When the output signal from the data amount management device 34 represents that the amount of the encoded data in the buffer memory 33 has reached the memory-empty value, the program advances from the step S9 to a step S10. Otherwise, the program returns from the step S9 to the step S7. Therefore, the operation of the signal processing circuit 36 by the step S7 and the recording of the information signal on the optical-disc data area by the step S8 are continued until the amount of the encoded data in the buffer memory 33 reaches the memory-empty value. As shown in FIG. 16, when the time T2 has elapsed from the moment of the increase of the amount of the encoded data in the buffer memory 33 to the memory-full value, the amount of the encoded data in the buffer memory 33 reaches the memory-empty value.

The step S10 controls the buffer memory 33 to suspend the read-out of the encoded data therefrom. Since the writing of the encoded data into the buffer memory 33 is continued, the suspension of the read-out of the encoded data therefrom causes the amount of the encoded data in the buffer memory 33 to start increasing again as shown in FIG. 16. In addition, the step S10 controls the optical pickup 13 via the controller 14 and the servo circuit 19 to suspend the recording of the information signal on the data area in the first recording layer L0 of the optical disc 11.

A step S11 following the step S10 receives, from the controller 14, address information about the currently-accessed position on the optical disc 11. It should be noted that the controller 14 gets the address information in a know way. The step S11 refers to the received address information and determines whether or not the currently-accessed position on the optical disc 11 is in a prescribed zone near the end address of the data area in the first recording layer L0 of the optical disc 11. When the currently-accessed position on the optical disc is in the prescribed zone, the program advances from the step S11 to a step S12. Otherwise, the program returns from the step S11 to the step S3.

As previously mentioned, the read-out of the encoded data from the buffer memory 33 is suspended by the step S10 while the writing of the encoded data thereinto is continued. Therefore, the amount of the encoded data in the buffer memory 33 starts increasing again. Hereafter, a description will be given of the case where the sequence of the steps S3-S11 continues to be iterated. As shown in FIG. 16, when the time T3 has elapsed from the moment of the decrease of the amount of the encoded data in the buffer memory 33 to the memory-empty value, the amount of the encoded data in the buffer memory 33 reaches the reference value. Then, the steps S4 and S5 place and hold the optical pickup 13 in the kick waiting state. As shown in FIG. 16, when the time T0 has elapsed from the moment of the increase of the amount of the encoded data in the buffer memory 33 to the reference value, the amount of the encoded data in the buffer memory 33 reaches the memory-full value. Then, the step S7 starts the read-out of the encoded data from the buffer memory 33 again while maintaining the writing of the encoded data from the compression circuit 32 into the buffer memory 33. The rate of the read-out of the encoded data from the buffer memory 33 is higher than the rate of the writing of the encoded data thereinto. Consequently, the amount of the encoded data in the buffer memory 33 starts decreasing again. The step S7 controls the signal processing circuit 36 to convert the encoded data into a pre-processed signal to be recorded. The preprocessed signal is handled as an information signal to be recorded. The step S8 commands the controller 14 to start recording the information signal on the data area in the first recording layer L0 from a next record-starting-sector address position. As shown in FIG. 16, when the time T4 has elapsed from the moment of the increase of the amount of the encoded data in the buffer memory 33 to the memory-full value, the amount of the encoded data in the buffer memory 33 reaches the memory-empty value. Then, the step S10 suspends the read-out of the encoded data from the buffer memory 33. The sequence of the steps S3-S11 continues to be iterated until the step S11 determines that the currently-accessed position on the optical disc is in the prescribed zone near the end address of the data area in the first recording layer L0.

During the iteration of the sequence of the steps S3-S11, the amount of the encoded data in the buffer memory 33 varies as shown in FIG. 16 while the information signal is intermittently recorded on the data area in the first recording layer L0 of the optical disc 11. Thus, the implementation of the signal recording alternates with the suspension thereof. In FIG. 16, the signal recording is implemented during the time ranges T2, T4, T6, and T8 while the signal recording is suspended during the time ranges T1+T, T3+T0, T5+T0, and T7+T0.

When the step S11 determines that the currently-accessed position on the optical disc is in the prescribed zone near the end address of the data area in the first recording layer L0 of the optical disc 11, the program advances to the step S12. The step S12 controls, via the controller 14 and the servo circuit 19, the objective lens within the optical pickup 13 to move toward the optical disc 11 to focus the laser beam on the second recording layer L1 of the optical disc 11 instead of the first recording layer L0 thereof. In other words, the objective lens within the optical pickup 13 is moved to provide focus jump from the first recording layer L0 to the second recording layer L1. After the step S12, the program returns to the step S3.

Hereafter, a description will be given of the case where the sequence of the steps S3-S11 continues to be iterated after the program returns from the step S12 to the step S3. After the step S3 detects that the amount of the encoded data in the buffer memory 33 has reached the reference value, the step S4 moves the optical pickup 13 to a position corresponding to the address of a record starting sector in the data area of the second recording layer L1 in the optical disc 11. Then, the step S5 holds the optical pickup 13 in the kick waiting state concerning the record starting sector. After the amount of the encoded data in the buffer memory 33 reaches the memory-full value, the steps S7-S9 record the information signal on the data area in the second recording layer L1 until the amount of the encoded data in the buffer memory 33 decreases to the memory-empty value. When the amount of the encoded data in the buffer memory 33 decreases to the memory-empty value, the step S10 suspends the read-out of the encoded data from the buffer memory 33 and also the recording of the information signal on the data area in the second recording layer L1. Then, the step S11 determines whether or not the currently-accessed position on the optical disc 11 is in a prescribed zone near the end address of the data area in the second recording layer L1. When the currently-accessed position on the optical disc is in the prescribed zone, the current execution cycle of the program segment ends. Otherwise, the program returns from the step S11 to the step S3.

During the iteration of the sequence of the steps S3-S11 after the return of the program from the step S12 to the step S3, the amount of the encoded data in the buffer memory 33 repetitively varies between the memory-empty value and the memory-full value while the information signal is intermittently recorded on the data area in the second recording layer L1 of the optical disc 11. Thus, the implementation of the signal recording alternates with the suspension thereof.

As understood from the above description, the focus jump from the first recording layer L0 to the second recording layer L1 is performed while the recording of the information signal on the optical disc 11 remains suspended and the amount of the encoded data in the buffer memory 33 continues to increase from the memory-empty value toward the memory-full value. The difference between the rate of the read-out of the encoded data from the buffer memory 33 and the rate of the writing of the encoded data thereinto is utilized to record the information signal on the data areas in the first and second recording layers L0 and L1 without interrupting the feed of the input signal to the disc drive apparatus.

Seventh Embodiment

A seventh embodiment of this invention relates to an optical disc which is similar to one of the optical discs in FIGS. 6-9 except that the PCA e1 or e11 in the second recording layer L1 is in an another place which does not overlap the PCA d1 or d11 in the first recording layer L0 as viewed in the axial direction of the disc (that is, the direction perpendicular to the major surfaces of the disc or the direction of the propagation of the laser beam). For example, as viewed in the axial direction of the disc, the PCA e1 or e11 in the second recording layer L1 is opposed to an area in the first recording layer L0 on which data such as all-zero data can be properly recorded before the recording of the information signal on the data area b12, b16, b21, or b25 in the second recording layer L1.

Eighth Embodiment

An eighth embodiment of this invention relates to an optical disc which is similar to one of the optical discs in FIGS. 7 and 9 except that the PCA e11 in the second recording layer L1 is opposed to the control data area d16 in the first recording layer L0 rather than the physical format area d14 as viewed in the axial direction of the disc (that is, the direction perpendicular to the major surfaces of the disc or the direction of the propagation of the laser beam).

Ninth Embodiment

A ninth embodiment of this invention relates to a disc drive apparatus which is similar to that in FIGS. 14-16 except for the following points. In the ninth embodiment of this invention, the data transfer rate of the information signal written into the buffer memory 33 from the compression circuit 32 is variable, and the memory-full value, the memory-empty value, and the reference value (see FIG. 16) are properly changed depending on the data transfer rate of the information signal.

What is claimed is:

1. An apparatus for recording a signal on a disc-shaped information recording medium including a laminate of a plurality of recording layers on and from which a signal can be optically recorded and reproduced while a laser beam is applied to the recording layers through one side of the medium, recording management areas provided in the recording layers respectively, and optical recording test areas provided in the recording layers respectively, wherein the recording layers include a first recording layer and a second recording layer, the apparatus comprising:

an optical pickup for emitting a laser beam toward the recording layers and receiving a laser beam returned therefrom;

a buffer;

means for using the optical pickup and thereby recording a test signal on the optical recording test area in the first recording layer;

means for moving the optical pickup to a position which corresponds to the optical recording test area in the second recording layer and which is out of overlap with the optical recording test area in the first recording layer as viewed in a direction of propagation of the laser beam;

means for using the optical pickup and thereby recording the test signal on the optical recording test area in the second recording layer;

means for using the optical pickup and thereby reproducing the test signal from the optical recording test area in the first recording layer;

means for deciding a first optimum power value of a laser beam for signal recording on the first recording layer in response to the test signal reproduced from the optical recording test area in the first recording layer;

means for using the optical pickup and thereby reproducing the test signal from the optical recording test area in the second recording layer;

means for deciding a second optimum power value of a laser beam for signal recording on the second recording layer in response to the test signal reproduced from the optical recording test area in the second recording layer;

means for moving the optical pickup to a position which corresponds to one of the recording management areas in the first recording layer and the second recording layer and which is between the optical recording test areas in the recording layers as viewed in the direction of propagation of the laser beam;

means for using the optical pickup and thereby recording management information on only said one of the recording management areas in the first recording layer and the second recording layer, wherein said management information has a first piece about the recording of the test signal on the first recording layer, a second piece about the recording of the test signal on the second recording layer, a third piece for identifying an apparatus which made recording of information, a fourth piece representing a name of a manufacturer of said apparatus, and a fifth piece representing an additional identification of said apparatus;

means for storing information, which is to be continuously recorded, into the buffer and simultaneously reading out the information from the buffer;

means for using the optical pickup and thereby continuously recording the information, which is being read out from the buffer, on the first recording layer up to a position in the first recording layer while controlling the optical pickup to emit a laser beam having a power equal to the decided first optimum power value; and means for controlling the optical pickup to make a jump from the first recording layer to the second recording layer, and then using the optical pickup and thereby continuously recording the information, which is being read out from the buffer, on the second recording layer from a position in the second recording layer which position corresponds to said position in the first recording layer while controlling the optical pickup to emit a laser beam having a power equal to the decided second optimum power value after the continuously recording of the information on the first recording layer up to said position is completed.

2. A method of recording a signal on a disc-shaped information recording medium including a laminate of a plurality of recording layers on and from which a signal can be optically recorded and reproduced while a laser beam emitted from an optical pickup is applied to the recording layers through one side of the medium, recording management areas provided in the recording layers respectively, and optical recording test areas provided in the recording layers respectively, wherein the recording layers include a first recording layer and a second recording layer, the method comprising the steps of:

using the optical pickup and thereby recording a test signal on the optical recording test area in the first recording layer;

moving the optical pickup to a position which corresponds to the optical recording test area in the second recording layer and which is out of overlap with the optical recording test area in the first recording layer as viewed in a direction of propagation of the laser beam;

using the optical pickup and thereby recording the test signal on the optical recording test area in the second recording layer;

using the optical pickup and thereby reproducing the test signal from the optical recording test area in the first recording layer;

deciding a first optimum power value of a laser beam for signal recording on the first recording layer in response to the test signal reproduced from the optical recording test area in the first recording layer;

using the optical pickup and thereby reproducing the test signal from the optical recording test area in the second recording layer;

deciding a second optimum power value of a laser beam for signal recording on the second recording layer in response to the test signal reproduced from the optical recording test area in the second recording layer;

moving the optical pickup to a position which corresponds to one of the recording management areas in the first recording layer and the second recording layer and which is between the optical recording test areas in the recording layers as viewed in the direction of propagation of the laser beam;

using the optical pickup and thereby recording management information on only said one of the recording management areas in the first recording layer and the second recording layer, wherein said management information has a first piece about the recording of the test signal on the first recording layer, a second piece about the recording of the test signal on the second recording layer, a third piece for identifying an apparatus which made recording of information, a fourth piece representing a name of a manufacturer of said apparatus, and a fifth piece representing an additional identification of said apparatus;

storing information, which is to be continuously recorded, into a buffer and simultaneously reading out the information from the buffer;

using the optical pickup and thereby continuously recording the information, which is being read out from the buffer, on the first recording layer up to a position in the first recording layer while controlling the optical pickup to emit a laser beam having a power equal to the decided first optimum power value; and controlling the optical pickup to make a jump from the first recording layer to the second recording layer, and then using the optical pickup and thereby continuously recording the information, which is being read out from the buffer, on the second recording layer from a position in the second recording layer which position corresponds to said position in the first recording layer while controlling the optical pickup to emit a laser beam having a power equal to the decided second optimum power value after the continuously recording of the information on the first recording layer up to said position is completed.

3. A method of recording and reproducing a signal on and from a disc-shaped information recording medium including a laminate of a plurality of recording layers on and from which a signal can be optically recorded and reproduced while a laser beam emitted from an optical pickup is applied to the recording layers through one side of the medium, recording management areas provided in the recording layers respectively, and optical recording test areas provided in the recording layers respectively, wherein the recording layers include a first recording layer and a second recording layer, the method comprising the steps of:

using the optical pickup and thereby recording a test signal on the optical recording test area in the first recording layer;

moving the optical pickup to a position which corresponds to the optical recording test area in the second recording layer and which is out of overlap with the optical recording test area in the first recording layer as viewed in a direction of propagation of the laser beam;

using the optical pickup and thereby recording the test signal on the optical recording test area in the second recording layer;

using the optical pickup and thereby reproducing the test signal from the optical recording test area in the first recording layer;

deciding a first optimum power value of a laser beam for signal recording on the first recording layer in response to the test signal reproduced from the optical recording test area in the first recording layer;

using the optical pickup and thereby reproducing the test signal from the optical recording test area in the second recording layer;

deciding a second optimum power value of a laser beam for signal recording on the second recording layer in response to the test signal reproduced from the optical recording test area in the second recording layer;

moving the optical pickup to a position which corresponds to one of the recording management areas in the first recording layer and the second recording layer and which is between the optical recording test areas in the recording layers as viewed in the direction of propagation of the laser beam;

using the optical pickup and thereby recording management information on only said one of the recording management areas in the first recording layer and the second recording layer, wherein said management information has a first piece about the recording of the test signal on the first recording layer, a second piece about the recording of the test signal on the second recording layer, a third piece for identifying an apparatus which made recording of information, a fourth piece representing a name of a manufacturer of said apparatus, and a fifth piece representing an additional identification of said apparatus;

storing information, which is to be continuously recorded, into a buffer and simultaneously reading out the information from the buffer;

using the optical pickup and thereby continuously recording the information, which is being read out from the buffer, on the first recording layer up to a position in the first recording layer while controlling the optical pickup to emit a laser beam having a power equal to the decided first optimum power value;

controlling the optical pickup to make a jump from the first recording layer to the second recording layer, and then using the optical pickup and thereby continuously recording the information, which is being read out from the buffer, on the second recording layer from a position in the second recording layer which position corresponds to said position in the first recording layer while controlling the optical pickup to emit a laser beam having a power equal to the decided second optimum power value after the continuously recording of the information on the first recording layer up to said position is completed;

using the optical pickup and thereby reproducing the recorded information from the medium; and outputting the reproduced information.

* * * * *